US010148339B2

(12) United States Patent
Jovanovic et al.

(10) Patent No.: US 10,148,339 B2
(45) Date of Patent: *Dec. 4, 2018

(54) COMMUNICATION SYSTEM WITH CHANNEL COMPENSATING EQUALIZER

(71) Applicant: CommScope Technologies LLC

(72) Inventors: Milun Jovanovic, Buchdorf (DE);
Alfons Dussmann, Gansheim (DE);
Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 629 days.

This patent is subject to a terminal disclaimer.

(21) Appl. No.: 14/336,720

(22) Filed: Jul. 21, 2014

(65) Prior Publication Data

US 2014/0328245 A1 Nov. 6, 2014

Related U.S. Application Data

(63) Continuation of application No. 13/527,154, filed on Jun. 19, 2012, now Pat. No. 8,787,429.

(51) Int. Cl.
*H04B 7/155* (2006.01)
*H04L 27/26* (2006.01)
(Continued)

(52) U.S. Cl.
CPC ........... *H04B 7/15507* (2013.01); *H04B 1/10* (2013.01); *H04B 7/15528* (2013.01);
(Continued)

(58) Field of Classification Search
CPC ..... H04L 5/0053; H04L 25/021; H04L 25/03; H04L 25/0248; H04B 7/063;
(Continued)

(56) References Cited

U.S. PATENT DOCUMENTS 4,845,746 A 7/1989 Li
5,134,464 A 7/1992 Basile et al.
(Continued)

OTHER PUBLICATIONS

Newton et al., Newton's Telecommunications Dictionary (18th ed), 2002, Harry Newton, Published by CMP Books, ISBN 1-57820-104-7, p. 134.*

(Continued)

*Primary Examiner* — Jackie Zuniga Abad
(74) *Attorney, Agent, or Firm* — Fogg & Powers LLC

(57) ABSTRACT

A communication system and method for extending coverage of a base transceiver station. The communication system includes processing circuitry that receives a communication signal over a wireless channel. The received communication signal is processed through an adaptable equalizer to reduce noise, distortion, interference, and frequency errors. In another aspect of the invention, a frequency of a reference signal in the communication system is adjusted to compensate for frequency errors between the communication system and the source of the communication signal. The equalized and frequency adjusted communication signal is then retransmitted into an extended coverage area. Wireless coverage is thereby provided between a base transceiver station and a mobile device in the extended coverage area.

20 Claims, 15 Drawing Sheets

(51) Int. Cl.
*H04L 25/03* (2006.01)
*H04B 1/10* (2006.01)

(52) U.S. Cl.
CPC .... *H04L 25/03019* (2013.01); *H04L 27/2662* (2013.01); *H04L 2025/03414* (2013.01); *H04L 2025/03783* (2013.01)

(58) Field of Classification Search
CPC .. H04B 7/0456; H04B 7/0639; H04B 7/0619; H04B 7/0434; H04B 7/0408
See application file for complete search history.

(56) References Cited

U.S. PATENT DOCUMENTS

| | | |
|---|---|---|
| 5,163,044 A | 11/1992 | Golden |
| 5,790,632 A | 8/1998 | Antonio et al. |
| 6,038,267 A | 3/2000 | Oura et al. |
| 6,385,176 B1 | 5/2002 | Iyengar et al. |
| 6,606,483 B1 | 8/2003 | Baker et al. |
| 6,652,286 B1 | 11/2003 | Larsen |
| 6,697,603 B1 | 2/2004 | Lovinggood et al. |
| 6,714,587 B1 | 3/2004 | Van Houtum et al. |
| 6,831,900 B2 | 12/2004 | Blake |
| 6,879,625 B1 | 4/2005 | Levonas et al. |
| 6,934,511 B1 | 8/2005 | Lovinggood et al. |
| 6,940,893 B1 | 9/2005 | Pinkney et al. |
| 7,043,203 B2 | 5/2006 | Miquel et al. |
| 7,088,953 B2 | 8/2006 | Bongfeldt |
| 7,133,442 B2 | 11/2006 | Hamdi |
| 7,180,963 B2 | 2/2007 | Wang et al. |
| 7,423,983 B1 | 9/2008 | Li et al. |
| 7,724,093 B2 | 5/2010 | Wormer et al. |
| 7,809,047 B2 | 10/2010 | Kummetz |
| 7,978,113 B2 | 7/2011 | Kulchycki |
| 8,364,076 B2 | 1/2013 | Eum et al. |
| 8,391,430 B2 | 3/2013 | Mihota |
| 8,542,623 B2 | 9/2013 | Proctor, Jr. et al. |
| 8,787,429 B2 | 7/2014 | Jovanovic et al. |
| 8,817,921 B2 | 8/2014 | Lee et al. |
| 2008/0309421 A1* | 12/2008 | Wormer .................. H03L 7/087 331/1 A |
| 2011/0070839 A1* | 3/2011 | Eum ....................... H04B 1/525 455/63.1 |

OTHER PUBLICATIONS

The Network Encyclopedia, "carrier signal", 2016, http://www.thenetworkencyclopedia.com/entry/carrier-signal/.*
Ten-Page Lyons, R.G., "Digital Filter Terminology", Addision Wesley Longman, Inc., Appendix F, pp. 1-9; 1997.

* cited by examiner

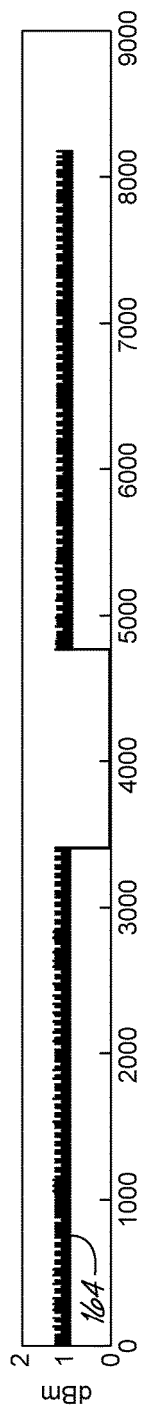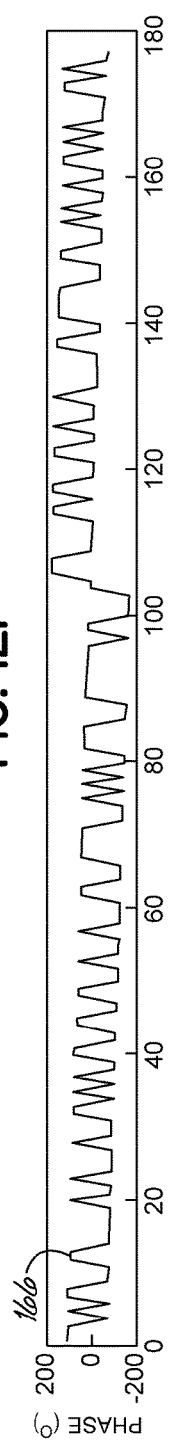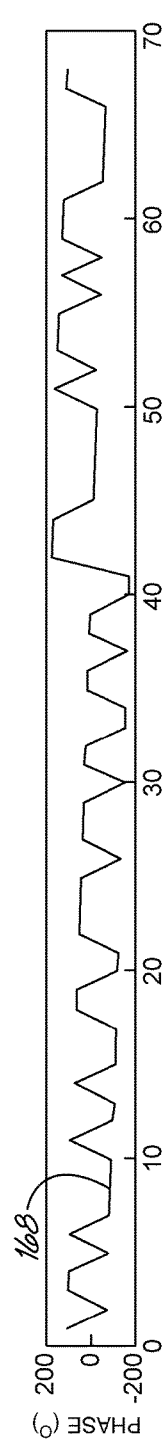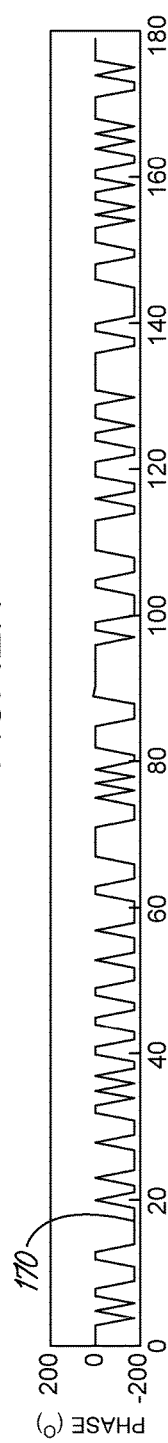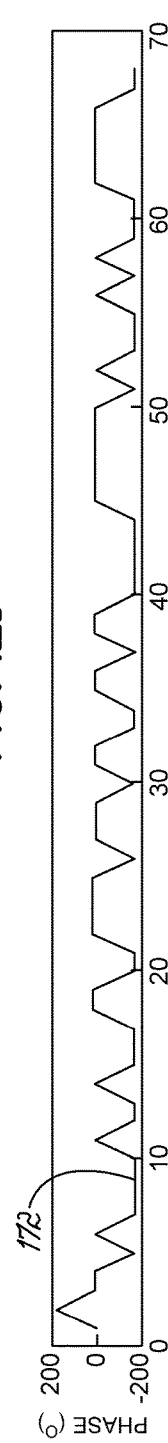

COMMUNICATION SYSTEM WITH CHANNEL COMPENSATING EQUALIZER

RELATED APPLICATIONS

This application is a continuation application of U.S. patent application Ser. No. 13/527,154, filed Jun. 19, 2012, and entitled "COMMUNICATION SYSTEM WITH CHANNEL COMPENSATING EQUALIZER", which application is incorporated herein by reference in its entirety.

BACKGROUND OF THE INVENTION

The widespread proliferation of wireless devices has given rise to an expectation among wireless customers for constant and reliable communication at nearly all times and in all places. Wireless carriers typically attempt to provide reliable wireless coverage to their customers by deploying a plurality of outdoor base transceiver stations (BTSs) over a defined coverage area. These BTSs are interconnected to form a network that transmits and receives wireless communication signals and thereby provides communication links to wireless devices in the defined coverage area. However, many areas frequented by wireless device users are partially or completely shielded from the signals transmitted by the BTSs. To improve wireless signal strength in these shielded areas, repeaters, distributed antenna systems, and similar communications systems have been developed that extend wireless signal coverage into areas where the RF signal penetration from BTSs is normally limited or absent. For example, these communications systems might be deployed to extend coverage inside buildings, underground parking garages, tunnels, shadowed areas that are behind mountains or other obstructions, underground train systems and/or train cars, as well as various other isolated or shielded areas.

These communications systems in their simplest form include a donor antenna and a coverage antenna coupled by a bi-directional amplifier. The donor antenna is located where it can receive signals from, and transmit signals to, one or more donor BTSs. The downlink signal received from the donor BTS is amplified by the bi-directional amplifier and coupled to the coverage antenna, which transmits the downlink signal into the extended coverage area. In the uplink direction, the coverage antenna receives signals transmitted by the wireless devices, which are in turn amplified by the bidirectional amplifier and transmitted back to the donor BTS through the donor antenna. In this way, the communication system provides both downlink and uplink coverage enhancement between the wireless device and donor BTS.

Ideally, the donor antenna is located where it has a direct line-of-sight path to the donor BTS to ensure the best possible signal path between the donor BTS and wireless device. However, extended coverage communication system installations are often constrained by geographic location and the available donor antenna mounting points of the extended coverage site. These constraints may preclude obtaining a direct line-of-sight path to the donor BTS. Moreover, in systems that repeat signals sourced from multiple commercial carriers, the donor antenna may be required to obtain signals from multiple BTSs in different locations. The problem of obtaining a clean signal may be further compounded in a mobile repeater system, such as found in a train, because the radio frequency environment is constantly changing. These additional constraints typically make obtaining a direct line-of-sight to the donor BTS difficult. Without a direct line-of-sight path to the donor BTS, the signal at the donor antenna is typically comprised of multiple reflected signals that arrive from different directions. These multiple signals generally have differing amplitudes and arrival times, so that the received signal suffers from multipath distortion. Interfering signals from other sources, such as a neighboring BTS operating in the same frequency band, may further distort and reduce the signal-to-noise ratio of the received signal as compared to a direct line-of-sight signal.

Multipath and other signal distortion and/or interference may result in channel fading, increased inter-symbol interference, and generally reduced signal quality. These reduced quality signals may cause reduced data rates, increased bit error rates, garbled speech, and may otherwise negatively affect link quality and the resulting wireless device user experience. Due to the changing nature of multipath and interfering signals, signal distortion also tends to vary with both time and frequency. Thus, a signal that provides a reliable communication link to the donor BTS at one moment in time may be subject to multipath distortion or other types of interference at another time. This uncertainty adds an additional layer of unreliability to the communication link. Because conventional extended coverage systems simply repeat the signal received at the donor antenna, any distortion or interference present at the donor antenna is repeated into the extended coverage area. Wireless devices in the extended coverage area are thereby affected by the distortion and/or interference present at the donor antenna.

Therefore, there is a need for communications systems and methods of extending wireless coverage that provide improved quality signals to wireless devices.

SUMMARY OF THE INVENTION

In a first aspect of the invention, a communication system includes a donor antenna and a coverage antenna operatively coupled together by processing circuitry that includes an equalizer. The processing circuitry receives a wireless signal through one of the donor or coverage antennas and processes the signal through the equalizer to generate a processed signal. The processed signal is then retransmitted through the other of the donor or coverage antennas.

In a second aspect of the invention, a method of providing a wireless signal to an extended coverage area includes receiving, with an antenna, a signal transmitted through a wireless communication channel. The received signal is repaired with an equalizer configured to compensate for distortion added to the signal by the wireless communication channel. The repaired signal is then transmitted into the extended coverage area.

BRIEF DESCRIPTION OF THE DRAWINGS

The accompanying drawings, which are incorporated in and constitute a part of this specification, illustrate various embodiments of the invention and, together with the general description of the invention given above and the detailed description of the embodiments given below, serve to explain the embodiments of the invention.

FIG. 12F is a graph illustrating the amplitude spectrum of the OFDM symbol from FIG. 12A after equalization that is the output of an embodiment of the repeater.

FIG. 12G is a graph illustrating phase drift in the continual pilot signal of the OFDM signal in FIG. 12F after transmission by the communication system and decoding in a wireless device.

FIG. 12H is a graph illustrating phase drift in the TPS pilot signal of the OFDM signal in FIG. 12E after transmission by the communication system and decoding in the wireless device.

FIG. 12I is a graph illustrating the phase of the continual pilot signal of FIG. 12G after frequency correction in the wireless device.

FIG. 12J is a graph illustrating the phase of the TPS pilot signal of FIG. 12H after frequency correction in the wireless device.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and to provide a clear understanding.

DETAILED DESCRIPTION OF THE INVENTION

Embodiments of the invention are generally directed to a communication system (e.g., a repeater or distributed antenna system) that extends the coverage area of a base transceiver station (BTS) into areas that would otherwise be shielded from the BTS. The communication system includes at least one signal processing module with an equalizer. The equalizer adaptively compensates for distortion added to the uplink and/or downlink signals by non-idealities in a radio frequency channel between the communication system and the signal source. The signal processing module may also reduce the effects of interference by repairing the signal based on known characteristics of the transmitted signal. In particular, the signal processing module mitigates the effects of multipath and other interference present at the donor antenna of the communication system, thereby improving the quality of the signals received by wireless devices operating in the extended coverage area. The signal processing module may thereby improve the signal quality in the extended coverage area as compared to communication systems lacking the signal repairing functions of the signal processing module.

Figure 1A:
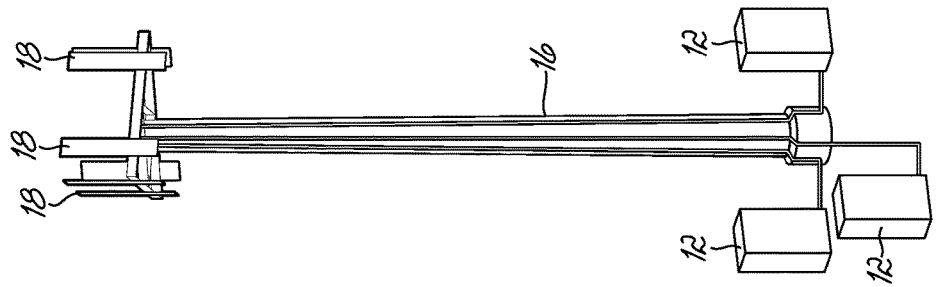
FIG. 1A is a perspective view of the BTS in FIG. 1.
Figure 1:
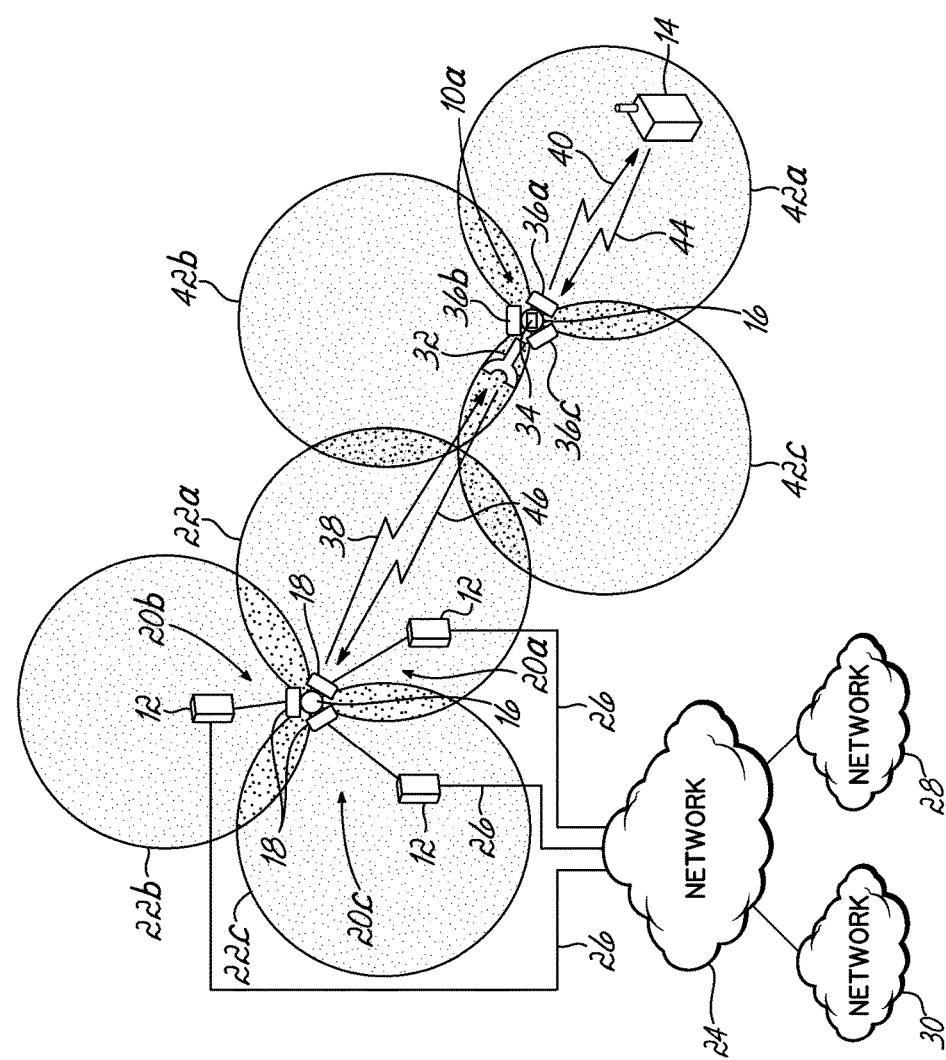
FIG. 1 is a diagram illustrating a wireless network configuration in which coverage of a BTS is extended into a neighboring region by a communication system.
Figure 2:
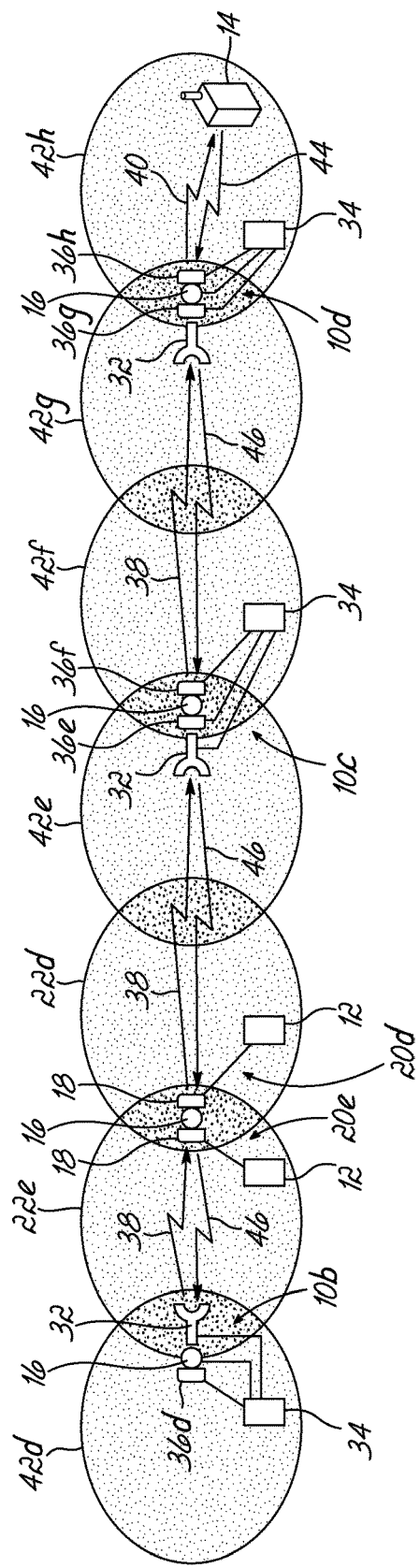
FIG. 2 is a diagram illustrating a wireless network configuration in which coverage of a BTS is extended along a linear path by a series of communication systems.
Figure 3:
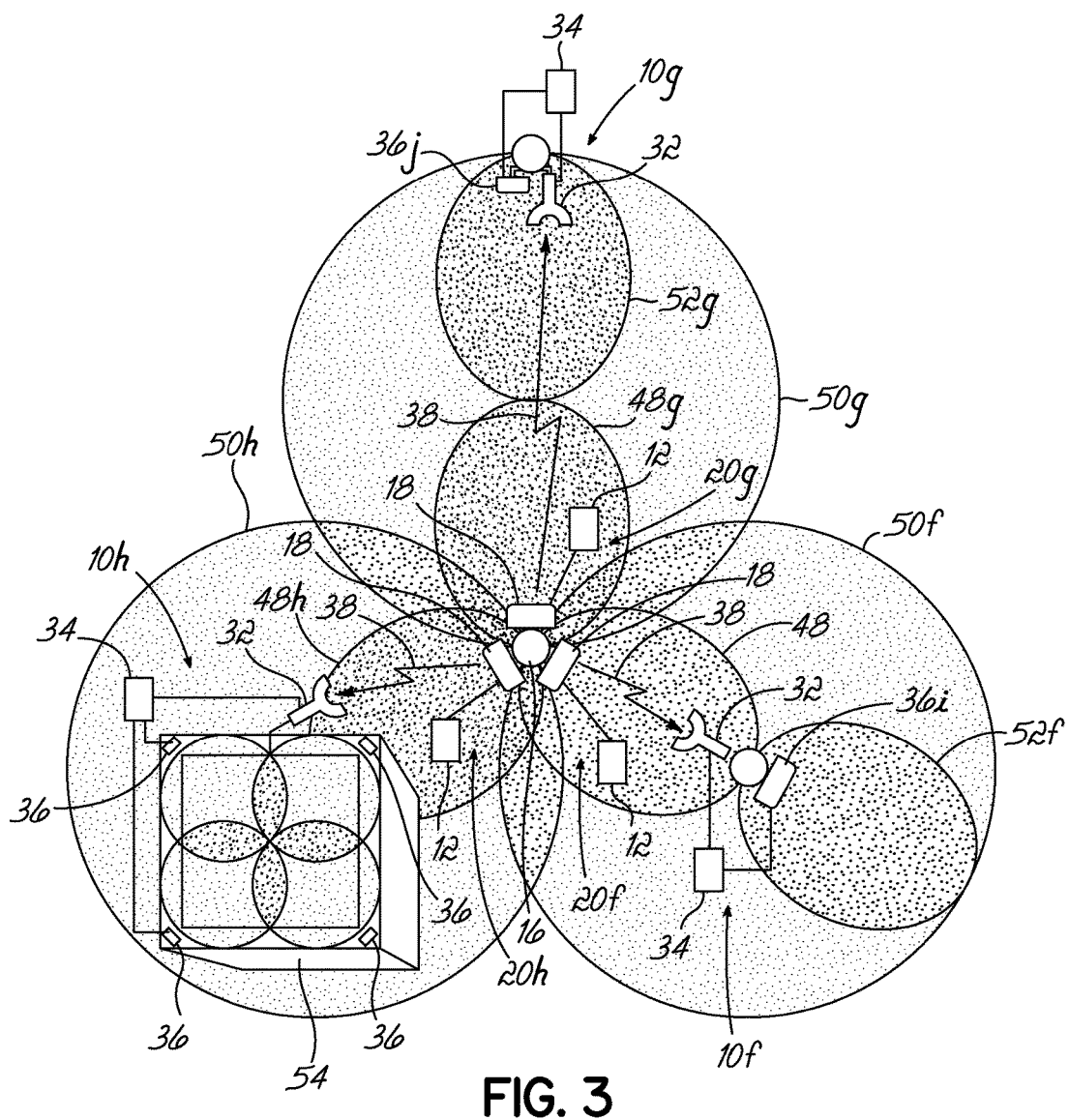
FIG. 3 is a diagram illustrating a wireless network configuration in which coverage of a BTS is improved within an existing coverage area by multiple communication systems.

Referring now to FIGS. 1-3, in which like reference numbers denote like elements throughout the several views, a communication system for extending wireless coverage, referred to hereinafter generally as a signal repeating system 10, may be used to extend the coverage of one or more BTSs 12. Coverage is typically extended in situations where the unenhanced coverage area of a BTS 12 is insufficient to provide a desired footprint. Holes in coverage may be caused by manmade and/or natural obstructions (e.g., tunnels or mountains), as well as simply by the attenuation of wireless signals due to the distance between the BTS 12 and a wireless device 14.

A typical wireless carrier network includes a plurality of towers 16 or other elevated structures, such as buildings, each of which provides an elevated platform for mounting one or more antennas 18. To reduce the number of towers and/or locations required to provide wireless signals to the desired coverage area, multiple BTSs 12 are typically co-located at each tower 16. Each BTS 12 is typically coupled to a directional antenna 18 mounted to the tower 16 to form a sector 20 that provides a coverage footprint 22. Each tower 16 thus typically includes multiple sectors 20, with a typical deployment including three sectors 20 per tower 16. Each sector 20 is typically configured to provide an overlapping coverage footprint 22 in a different area than the other sectors 20. While a set of antennas 18 may be used to provide signal coverage for one service provider, other sets of antennas may be co-located on the tower 16 or other structure. These other sets of antennas may be coupled with separate BTSs for other service providers, so that a single tower/location provides coverage for multiple service providers.

Each BTS 12 is typically connected to a core network 24 by backhaul links 26, which may be provided over an optical fiber, a wireless link, a twisted pair of copper wires, or some other suitable transmission medium. The backhaul links 26 complete the communication path between the wireless devices 14 and the core network 24, which in turn then provides connectivity to a public switched telephone network (PSTN) 28 and/or a data network 30, such as the Internet.

Base station transceiver equipment is typically more costly than signal repeating system equipment. In addition, backhaul lines 26 are usually leased from a local wire-line carrier, so the expense of equipping and operating a BTS 12 may be significantly higher than that for a signal repeating system 10. Therefore, to reduce system expenses, a signal repeating system 10 may be deployed to extend the footprint 22 of an existing sector 20 rather than deploying an additional BTS 12 to provide coverage extension. One such situation is illustrated in FIG. 1.

FIG. 1 includes signal repeating system 10a and a donor site tower 16 that hosts three sectors 20a-20c. Each sector 20a-20c includes a BTS 12 and antenna 18, and provides a coverage footprint 22a-22c that overlaps neighboring sectors. Signal repeating system 10a is configured to increase the coverage of sector 20a and includes one or more donor antennas 32, one or more repeater signal processing units 34, and one or more coverage antennas 36a-36c. The one or more signal processing units 34 include signal repeating circuitry that couples the antennas 32, 36. The signal repeating system 10a may be in the form of a typical outdoor repeater and may have a single coverage antenna.

Figure 1B:
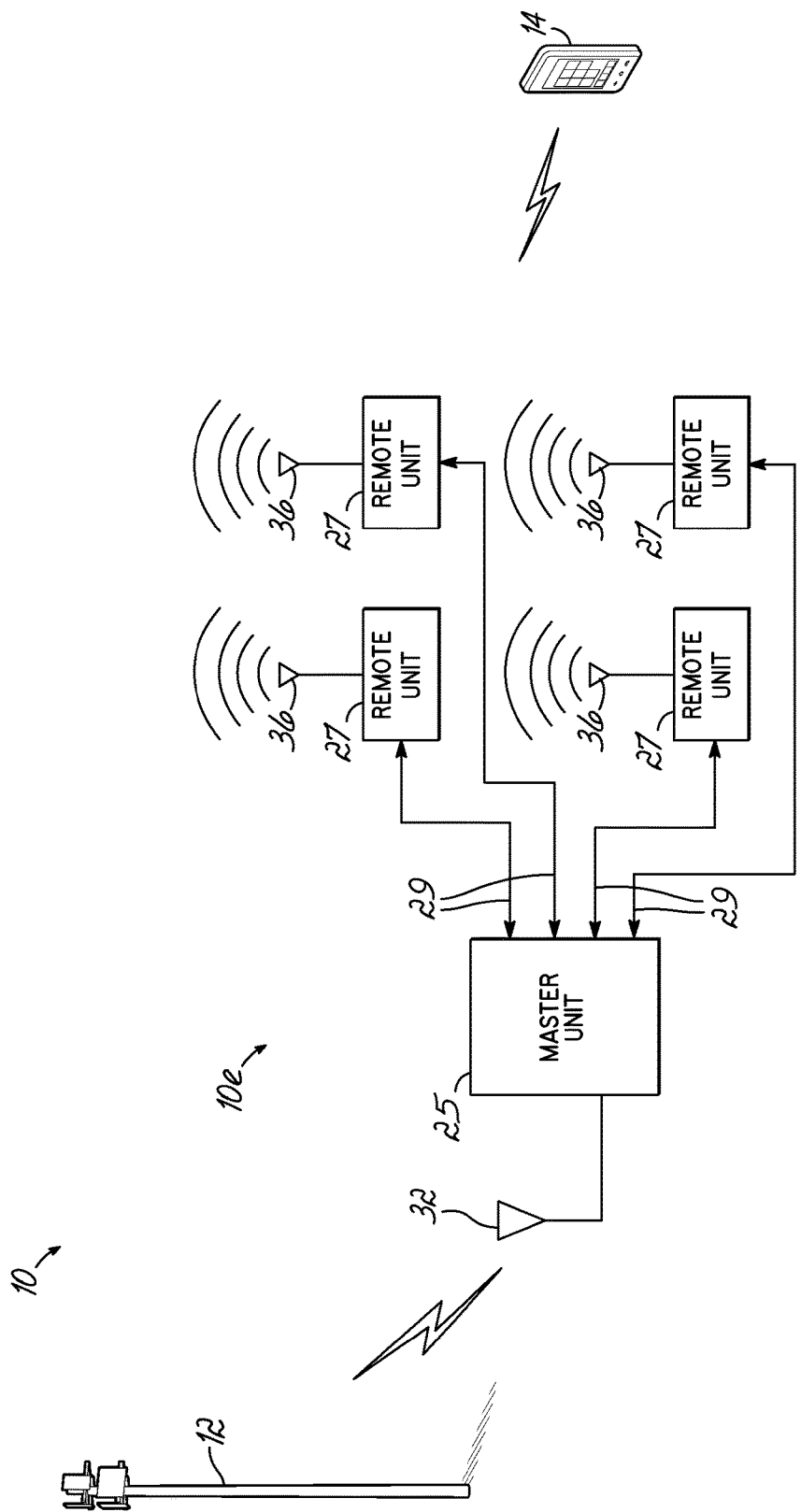
FIG. 1B is a diagram illustrating components of a communication system that includes a distributed antenna system.
Figure 4:
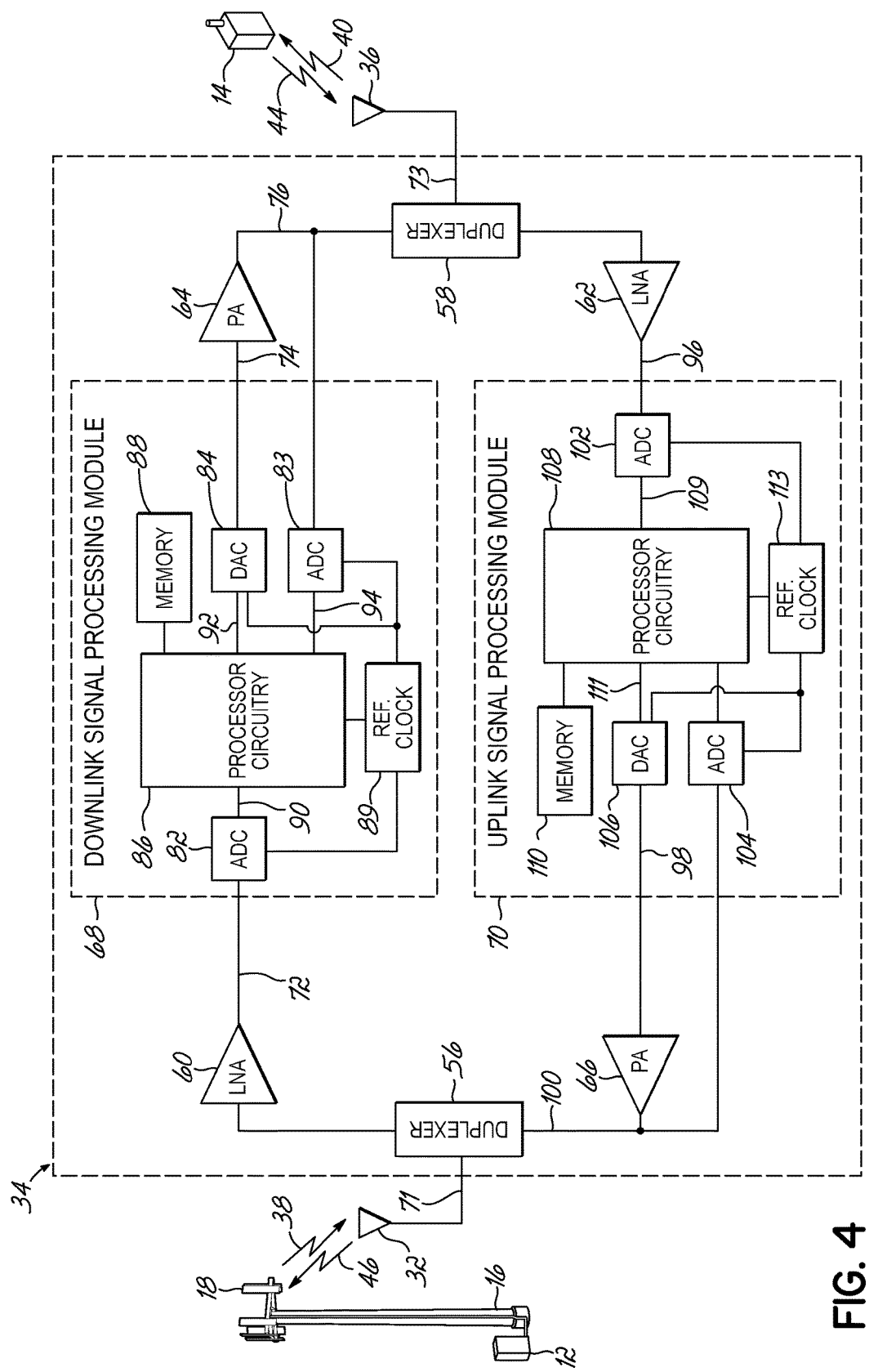
FIG. 4 is a block diagram of an embodiment of the invention including a BTS, uplink and downlink processing modules, and a wireless device.

Alternatively, signal repeating system 10a may be implemented in a distributed system, such as a distributed antenna system (DAS) indicated specifically as system 10e and illustrated in FIG. 1B. In the DAS system 10e, the one or more donor antennas 32 are generally coupled to a main unit or master unit 25 that is coupled to a plurality of distributed remote units or antenna units 27. The remote units 27 are distributed throughout the extended coverage area, such as in different compartments or cars of a train, rooms in a building, or any other areas in which enhanced or extended coverage is to be provided. The various remote units 27 are coupled to the master unit 25 with suitable communication links 29, such as coaxial or fiber-optic cables. The master unit 25 may also include the signal repeating circuitry of the signal processing unit 34, which is illustrated in FIG. 4 and described in more detail below.

The invention is described herein with respect to an embodiment where the various hardware components of the electronics for the signal repeating circuitry are illustrated as located in a common location, such as a repeater housing or housing for a master unit. But it will be understood by those of ordinary skill in the art that the components might be distributed throughout the signal repeating system 10 as desired to implement the invention. Also, where single donor antennas and coverage antennas are illustrated, the signal repeating system 10 of the invention may implement multiple donor antennas and multiple coverage antennas on the donor and coverage sides of the system.

The donor antenna 32 may be a directional antenna, and is oriented to capture downlink signals 38 transmitted from sector 20a. Because the donor antenna 32 typically has a relatively high gain and is mounted at an elevated position, the donor antenna 32 will typically capture a downlink signal 38 having a relatively high signal to noise ratio as compared to the signal that would be received by a wireless device 14 in the same location. The signal repeating system 10a is thus able to operate outside the normal coverage footprint 22a of sector 20a. To extend the coverage of sector 20a to the wireless device 14 outside the coverage footprint 22a, the received downlink signal 38 is amplified by the signal processing unit 34 and provided to the coverage antennas 36a-36c. The coverage antennas 36a-36c transmit the processed or repeated downlink signal 40, which is received by the wireless device 14 in the extended footprint or coverage area 42a.

In a similar fashion, uplink signals 44 transmitted by the wireless device 14 are received by one of the coverage antennas, such as coverage antenna 36a. These uplink signals 44 are amplified by the signal processing unit 34, and transmitted back to the donor BTS 12 as a repeated uplink signal 46 by the donor antenna 32. The signal repeating system 10a may also include optional frequency shifting circuitry so that the repeated downlink signal 40 and uplink signal 44 operate on different frequencies than the received downlink signal 38 and repeated uplink signal 46. In this way, the signal repeating system 10a may avoid generating interference within the coverage footprint 22a of sector 20a.

A second scenario where signal repeating systems may be used to extend coverage of a BTS 12 is illustrated in FIG. 2, which may represent a system covering a rural highway, train track, or other transportation corridor. Under the aforementioned scenario, the coverage of the BTSs 12 may be extended into extended coverage areas 42d-42h. To this end, signal repeating systems 10b-10d may be located on towers 16 along the transportation corridor, with each signal repeating system 10b-10d including a donor antenna 32 oriented towards a corresponding donor sector. Repeater 10b may be located near the edge of coverage footprint 22e and may retransmit the signal from sector 20e through coverage antenna 36d to extend the coverage of sector 20e into extended coverage area 42d. Similarly, repeater 10c may retransmit the signal from sector 20d through coverage antennas 36e and 36f to extend the coverage of sector 20d into extended coverage areas 42e and 42f, respectively.

To further extend the coverage of sector 20d along the route, signal repeating system 10d has donor antenna 32 oriented towards coverage antenna 36f of signal repeating system 10c. Signal repeating system 10c thus acts as a donor site for signal repeating system 10d so that the signal from sector 22d is repeated twice (or possibly a greater number of times) before being retransmitted via coverage antennas 36g and 36h into extended coverage areas 42g and 42h. In all other ways, the repeaters 10b-10d in FIG. 2 operate in essentially the same manner as the signal repeating system 10a illustrated in FIG. 1. That is to say, downlink signals 38 are captured by the donor antennas 32 and amplified in the signal processing units 34 before being retransmitted by the coverage antennas 36.

Uplink signals 44 transmitted by the wireless device 14 are received by the coverage antenna 36h and amplified by the signal processing unit 34 of signal repeating system 10d. The amplified signals are transmitted back to signal repeating system 10c through the donor antenna 32 of signal repeating system 10d. Signal repeating system 10c then further amplifies and relays the signals back to the donor BTS 12 in essentially the same manner. The coverage of each of the BTSs 12 is thereby extended to provide continuous coverage to wireless devices without deploying additional BTSs 12 at each of the towers 16.

FIG. 3 illustrates additional scenarios in which signal repeating systems 10 may be used to extend or enhance BTS 12 coverage. A tower 16 hosts three sectors 20f-20h, with each sector 20f-20h providing an associated inner coverage footprint 48f-48h and an outer coverage footprint 50f-50h. Many air interface standards, such as enhanced data rates for GSM (EDGE) and universal mobile telecommunications system (UMTS) to name but two, adjust data transmission rates based on the quality of received signals. In these types of systems, data speeds are typically higher for wireless devices 14 operating within an inner coverage footprint 48*f*-48*h* than for wireless devices 14 operating in an outer coverage footprint 50*f*-50*h*. These higher data speeds are due to the higher signal to noise ratios that naturally occur close to the tower 16.

To provide improve data speeds within the outer coverage footprints 50*f*, 50*g* of sectors 20*f* and 20*g*, repeaters 10*f*, 10*g* are configured to capture high signal to noise ratio signals from sectors 20*f* and 20*g*, respectively. The high signal to noise ratio signals captured by the repeaters 10*f*, 10*g* are repeated to create enhanced quality extended coverage areas 52*f*, 52*g*. These enhanced quality extended coverage areas 52*f*, 52*g* may lie largely within the outer coverage footprints 50*f*, 50*g* associated with respective sectors 20*f* and 20*g*.

Signal repeating systems are also commonly used to improve coverage inside buildings or other enclosed spaces 54, as illustrated by signal repeating system 10*h*. To this end, signal repeating system 10*h* receives signals from sector 20*h*. These signals are processed by the signal processing unit 34 of signal repeating system 10*h* and provided to a coverage antenna system, which may include multiple coverage antennas 36. Such systems are often referred to as distributed antenna systems (DAS), and may include active or amplified coverage antennas 36.

With traditional repeater systems, the link quality provided to wireless devices 14 in the extended or enhanced coverage areas 42, 52 is dependent on the quality of the original signal. The original signal is received by the donor antenna 32 of the associated signal repeating system 10 from the sending BTS 12 or other signal source. Even in cases where donor antennas 32 have line of sight to the BTS 12, ground reflections, as well as reflections off of aircraft, power lines and other reflective objects can result in signal degradation from multipath interference. In-band signals generated by other sources may also be picked up by the donor antenna and repeated in the coverage area, interfering with and further degrading the extended coverage signal. Because signal degradation is cumulative, repeated signals are subject to additional multipath and other interference between the coverage antenna 36 and wireless device 14. The cumulative nature of this interference may be especially troublesome when signals pass through multiple signal repeating systems 10, as illustrated by the wireless network in FIG. 2.

Typically, multipath signals result in inter-symbol interference at the receiving end of the communications link. This is because each of the multipath signals between the BTS 12 and wireless device 14 travels over a different path from the transmitter to the receiver. Because each path typically has a different distance as well as varying levels of attenuation, each multipath signal may have a different time delay, carrier phase, and amplitude. The sum of the multipath signals thus results in a distorted variable amplitude time smeared composite signal at the receiving antenna. Moreover, because the attenuation and electrical distance characteristics of each of the multiple signal paths between the BTS 12 and wireless device 14 tends to change with time, the resulting channel characteristics tend to vary over time and with carrier frequency.

Referring now to FIG. 4, a circuit block diagram of an exemplary signal processing unit 34 is illustrated for use in a wireless communication system consistent with embodiments of the invention. Specifically, the signal processing unit 34 facilitates communications between one or more BTSs 12 and one or more wireless devices 14 as illustrated in FIGS. 1-3 by providing uplink and downlink signal paths between the BTS 12 and the wireless device 14. In the exemplary embodiment illustrated in FIG. 4, the signal processing unit 34 includes donor side and coverage side duplexers 56, 58, downlink and uplink low noise amplifiers (LNAs) 60, 62, downlink and uplink power amplifiers 64, 66, and downlink and uplink signal processing modules 68, 70. Although embodiments of the invention are shown and described generally herein with respect a signal repeating system employing a repeater, persons having ordinary skill in the art will understand that embodiments of the invention could also be used with the DAS 10*e* of FIG. 1B. In such an embodiment, one or more of the components of the signal processing unit 34 could, for example, be included in or integrated with the master unit 25 of DAS 10*e*.

For the repeater of FIG. 4, a donor antenna 32 is coupled to the signal processing unit 34 via an antenna port 71 on the donor side duplexer 56, and a coverage antenna 36 is coupled to the signal processing unit 34 via an antenna port 73 on the coverage side duplexer 58. Downlink and uplink signals are thereby received from and provided to the donor and coverage antennas 32, 36 by the processing modules 68, 70 through the duplexers 56, 58, which split and combine the uplink and downlink signals as required.

In the downlink path, the donor antenna 32 receives downlink signal 38 from a BTS or other signal source, which is coupled to the downlink LNA 60 through the donor side duplexer 56. The downlink LNA 60 amplifies received downlink signal 38 and provides an amplified downlink signal 72 to the downlink signal processing module 68. The amplified downlink signal 72 may have sufficient amplitude to preserve the signal to noise ratio of the downlink signal 38 through the signal processing module 68. The amplified downlink signal 72 is processed by the downlink processing module 68 and provided to the downlink power amplifier 64. The downlink power amplifier 64 amplifies the processed downlink signal 74 to a power level suitable for transmission to the wireless device 14. The processed and amplified downlink signal 76 is then coupled to the coverage antenna 36 through the coverage side duplexer 58 for transmission to the wireless device 14. Signal repeating system 10 thereby provides a downlink path between donor BTS 12 and wireless device 14.

The downlink signal processing module 68 includes analog-to-digital converters (ADCs) 82, 83, a digital-to-analog converter (DAC) 84, processor circuitry 86, a memory 88, and a reference clock 89 that provides clock signals to the processor circuitry 86 and converters 82-84. The amplified downlink signal 72 is converted into a digital signal 90 by ADC 82. The ADC 82 may include frequency down-conversion circuits (not shown) to lower the frequency of the amplified downlink signal 72 prior to digitization. In any case, the digitized downlink signal 90 is provided to the processor circuitry 86, which may be realized, for example, by a combination of one or more Digital Signal Processors (DSPs), Field-Programmable Gate Arrays (FPGAs), Application Specific Integrated Circuit (ASICs), microprocessors, and/or any other combination of analog and digital circuits suitable for processing signals. The processor circuitry 86 is coupled to memory 88, which stores data accessible by the processor circuitry 86 and may contain program code that, when executed by the processor circuitry 86, implements one or more signal processing functions as required by embodiments of the invention.

The processor circuitry 86 processes the digitized downlink signal 90 and provides a processed digital downlink signal 92 to the DAC 84. The DAC 84, which may include frequency up-conversion circuitry (not shown), converts the processed digital downlink signal 92 to an analog signal suitable for amplification by downlink power amplifier 64. The amplified signal 76 is then transmitted to the wireless device 14 through the coverage antenna 36 as previously described.

In an embodiment of the invention, the processed and amplified downlink signal 76 is coupled to the input of ADC 83 to provide feedback signals to the signal processing functions implemented by the processor circuitry 86. The ADC 83 thereby provides a digitized feedback signal 94 to the processor circuitry 86. In an alternative embodiment, the processed digital downlink signal 92 may be used in place of signal 94 by the signal processing applications, in which case the ADC 83 is not required.

In the uplink path, the coverage antenna 36 receives uplink signal 44, which is coupled to the uplink LNA 62 through the coverage side duplexer 58. Similarly as described with respect to the downlink path, the uplink LNA 62 amplifies received uplink signal 44 and provides an amplified uplink signal 96 to the uplink signal processing module 70. The amplified uplink signal 96 is processed by the uplink processing module 70 and provided to the uplink power amplifier 66. In turn, the uplink power amplifier 66 amplifies the processed uplink signal 98 to a power level suitable for transmission to the BTS 12. The processed and amplified uplink signal 100 is coupled to the donor side duplexer 56, which further couples the signal 100 to the donor antenna 32. The donor antenna 32 transmits the repeated uplink signal 46 to the BTS 12 to complete the uplink path between the wireless device 14 and donor BTS 12.

The uplink signal processing module 70 operates in essentially the same manner as described with respect to the downlink signal processing module. To that end, processing module 70 includes ADCs 102, 104, DAC 106, processor circuitry 108, a memory 110, and a reference clock 113. Similarly as described with respect to the downlink module 68, the input ADC 102 converts the amplified uplink signal 96 into a digitized uplink signal 109 that is provided to the processor circuitry 108. Likewise, the DAC 106 converts a processed digital uplink signal 111 from the processor circuitry 108 into a processed analog uplink signal 98 suitable for amplification and transmission to the BTS 12.

Although shown as separate circuits in FIG. 4, persons having ordinary skill in the art will understand that the downlink module 68 and uplink module 70 may also be implemented using shared hardware and software components. For example, processor circuitry 86, 108 may use a single processor or a group of processors that process both uplink and downlink signals. Likewise, memories 88, 110 may be allocated from a single shared memory resource and the reference clocks 89, 113 may be comprised of a single reference clock shared by both modules 68, 70. Embodiments of the invention are therefore not limited to the specific hardware or software configuration shown in FIG. 4.

Figure 5:
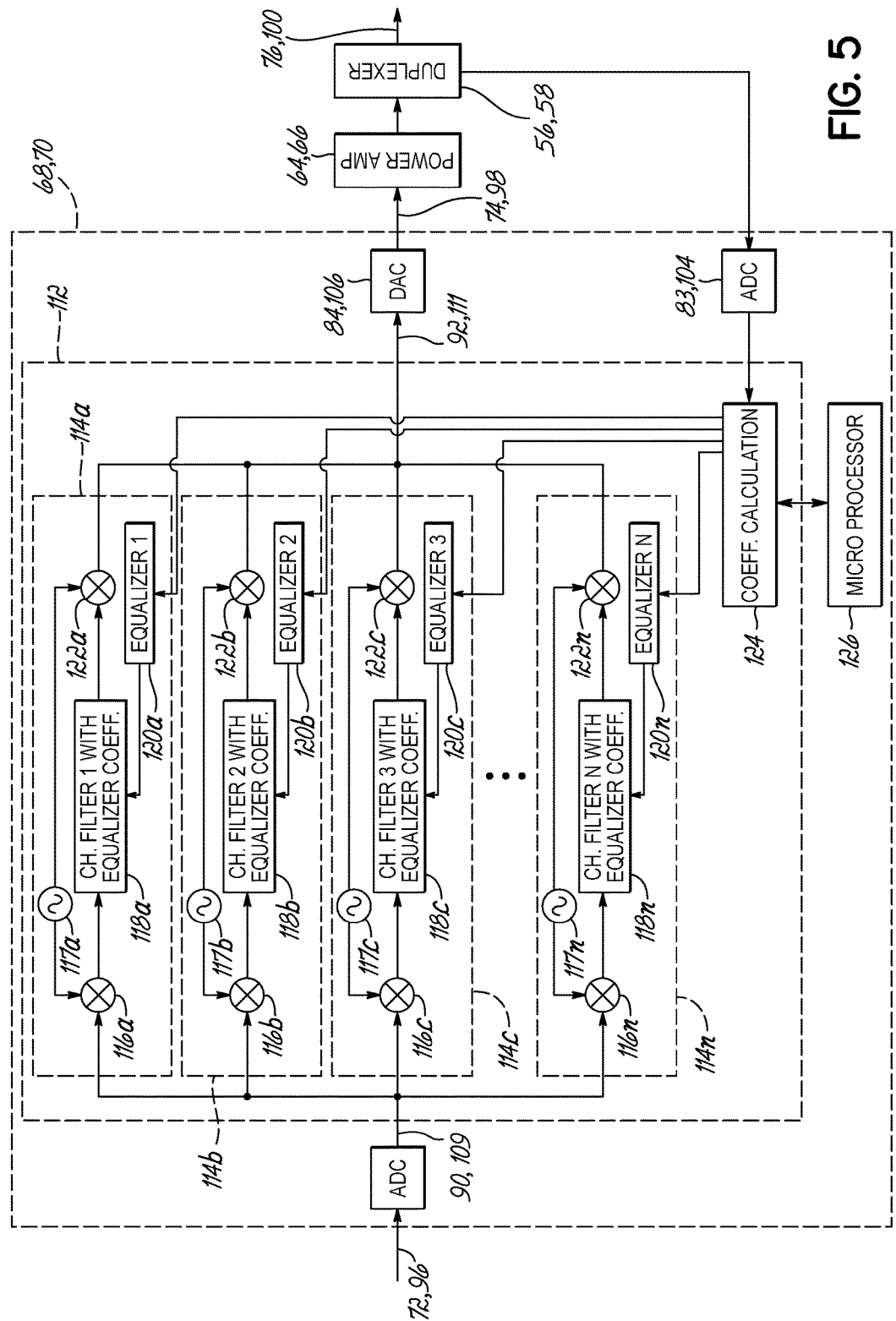
FIG. 5 is a block diagram illustrating additional details of the signal processing modules in FIG. 4.

Referring now to FIG. 5, wherein like reference numbers denote like parts in FIGS. 1-4, a circuit block diagram is presented that illustrates exemplary signal processing functions implemented in the processor circuits 86, 108 consistent with embodiments of the invention. The signal processing module 68, 70 as illustrated in FIG. 5 includes a signal processor component 112 and a microprocessor component 126. A signal processor component 112 represents a digital signal processing space within the processor circuits 86, 108 of the signal processing modules 68, 70. The signal processor component 112 may be provided within a suitable single chip component, such as an FPGA or DSP, or may be spread across multiple hardware components and/or processors.

Likewise, the microprocessor component 126 may be a separate processor, or may be included within the processor circuitry 86, 108 of the signal processing module 68, 70. In any case, the present invention is not limited to a specific architecture of the processing circuitry.

Each uplink and downlink signal will typically be assigned to a separate channel so that multiple wireless devices 14 can operate independently in the same area through the system of the invention. A channel may be defined by a unique carrier frequency or group of frequencies, a code word, time slot, or combinations thereof depending on the air interface utilized by the mobile network. The signal processor component 112 may be configured to extract individual uplink and/or downlink signals 72, 96 so that each signal is processed independently. For example, air interfaces utilizing frequency division multiplexing may have individual signal paths allocated by carrier frequency. For air interfaces in which a single data channel occupies multiple frequencies, each channel may be allocated multiple signal paths so that each frequency within the channel is processed individually.

To this end, at least one signal processing circuit or signal path 114a-114n is provided within the signal processor component 112. Each signal path 114a-114n includes signal processing and/or logic functions, which may be placed and connected using a suitable programming language, compiler, or other user interface to configure the signal processor component 112. These signal processing functions include an input mixer circuit 116a-116n, a local carrier signal generator circuit 117a-117n, a channel filter circuit 118a-118n, an equalizer circuit 120a-120n, and an output mixer circuit 122a-122n. By including a plurality of signal paths 114a-114n, the signal processor component 112 may separately process multiple downlink and/or uplink signals 72, 96 that are sharing a single wireless link. Although shown in this exemplary embodiment as separate circuits, persons having ordinary skill in the art will understand that the illustrated circuits 116a-116n, 117a-117n, 118a-118n, 120a-120n may be configured in various ways to achieve the desired signal processing. For example, each channel filter circuit 118a-118n may be integrated with its associated equalizer circuit 120a-120n so that the equalizer and channel filtering functions are performed by a single circuit. In addition, the input mixer circuits 116a-116n and output mixer circuits 120a-120n may receive carrier signals from different local carrier signal generator circuits operating at different frequencies, or from a single local carrier signal generator circuit operating at a single frequency. Embodiments of the invention are therefore not limited to the specific signal processing circuit architecture shown in FIG. 5.

The signal processor component 112 also includes an equalizer coefficient calculation circuit 124. The coefficient calculation circuit 124 may be operatively coupled to the output of the power amplifier 64, 66 through the ADC 83, 104. The coefficient calculation circuit 124 thereby receives samples of the processed and amplified signals 76, 100. In an alternative embodiment, the coefficient calculation circuit 124 receives the processed signal directly from the output of the signal paths 114a-114n, in which case the ADC 83, 104 may be omitted. In any case, the processed signal samples may include reference signals that the coefficient calculation circuit 124 utilizes to calculate equalizer coefficients.

In the exemplary embodiment illustrated in FIG. 5, signals provided over different frequencies are each converted to an intermediate or baseband frequency. This conversion is performed by the associated input mixer circuit 116a-116n, which mixes the digitized signals 90, 109 with a local carrier signal generated by the local carrier signal generator 117a-117n. The output of each mixer circuit 116a-116n is then processed through the associated channel filter circuit 118a-118n to isolate and correct the signal 72, 96. The equalizer circuit 120a-120n alters the response of its associated channel filter circuit 118a-118n to conform to a desired channel response corresponding to equalizer coefficients provided by the coefficient calculation circuit 124. The channel filter circuit 118a-118n is thereby configured to equalize, or repair, the signal 72, 96 based on the coefficients provided by the coefficient calculation circuit 124. Each signal 72, 96 is thereby processed through a signal path 114a-114n that is independently configurable to correct for the distortion and/or interference unique to the channel carrying the signal being processed. The equalized signals are then converted to desired transmission frequencies by the output mixer circuits 122a-122n and provided to the DAC 84, 106. The DAC 84, 106 converts the processed digital signals 92, 111 back into analog signals 74, 98, which are amplified by power amplifier 64, 66 and coupled to the appropriate antenna by duplexer 56, 58.

The type of equalizer circuit 120a-120n utilized (e.g., adaptive or decision based) may depend on the type of signal being processed, which in turn depends on the air interface used by the wireless network. Commonly encountered wireless networks include systems that utilize Orthogonal Frequency Division Multiplexing (OFDM), Global System for Mobile Communications (GSM), and Universal Mobile Telecommunications System/Code Division Multiple Access (UMTS/CDMA) air interfaces. The type of equalizer implemented is thus selected based on the air interface over which the signal is provided. In any case, equalizer coefficients may be calculated independently for each signal being processed. The equalizer circuits 120a-120n may thus be implemented completely in the digital part of the signal processing unit 34. The coefficients may be calculated in an FPGA for adaptive equalizers, or in a microprocessor component 126 for decision based equalizers such as commonly implemented with OFDM air interfaces.

Figure 6:
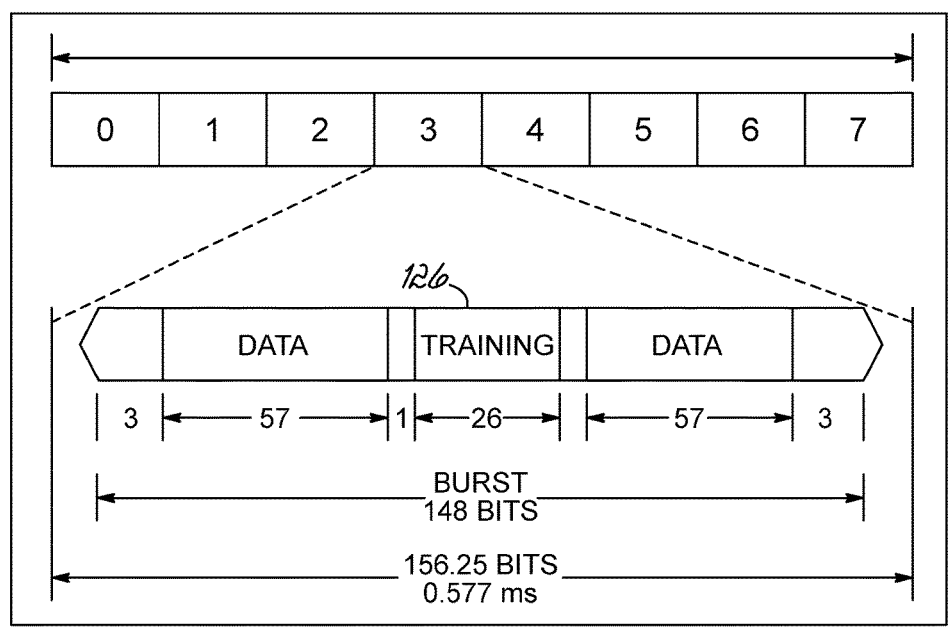
FIG. 6 is a diagram illustrating the structure of a GSM data packet including a training sequence.
Figure 7:
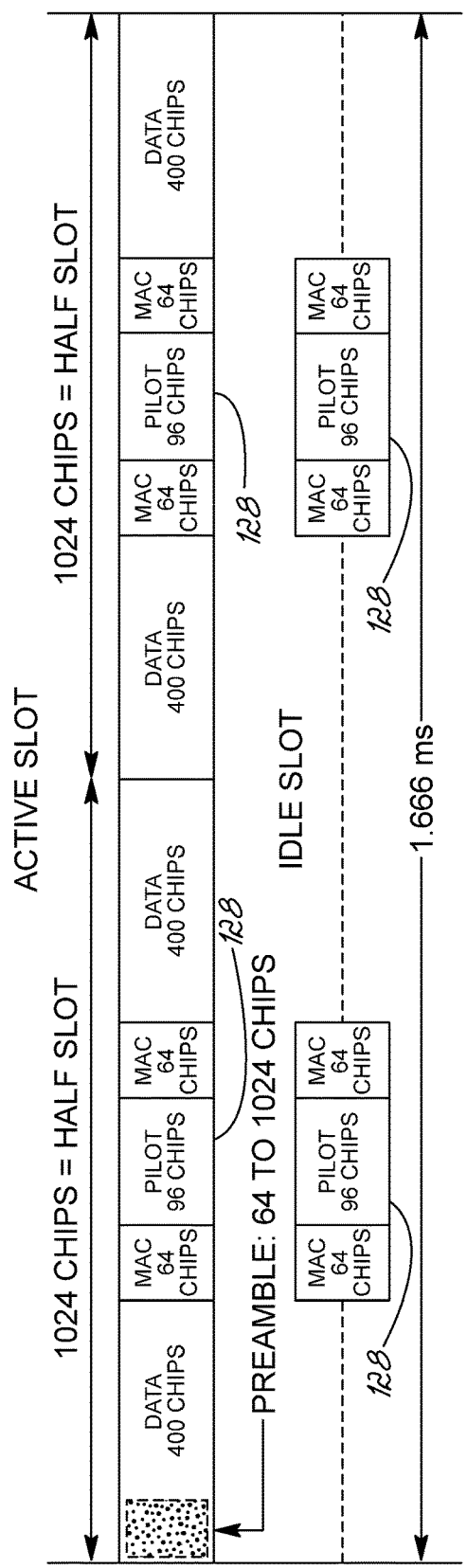
FIG. 7 is diagram illustrating an EVDO slot structure including pilot signals.

Referring now to FIGS. 6 and 7, exemplary data protocol structures are illustrated for GSM (FIG. 6) and Evolution-Data Optimized (EVDO) signals (FIG. 7). These data structures include training sequences 126, 128, which are comprised of known bit sequences. Because the training sequences 126, 128 have a known structure, they facilitate calculation of a transfer function for the channel over which the training sequence 126, 128 was transmitted. To this end, equalizer coefficients may be determined by comparing the received training sequence 126, 128 to the expected sequence. In a specific embodiment, the coefficient calculation circuit 124 may generate filter coefficients for a Finite Impulse Response (FIR) filter based on this comparison. Each equalizer circuit 120a-120n is thereby adapted to specific channel conditions based on the received training sequence 126, 128.

In accordance with one aspect of the invention, adaptive equalizers adapt to varying channel characteristics by minimizing the error between a known sequence of bits and the received and decoded sequence. To this end, an adaptive equalizer compares the received and decoded training sequence to the known sequence, and adjusts the equalizer coefficients to minimize the difference. In another embodiment, adaptive equalizers use pilot signals embedded in transmitted symbols in a similar manner to determine channel characteristics. Configured with said filter coefficients, the adaptive equalizer acts as a filter that has complementary characteristics to the wireless channel though which the communications signal is passing. By processing the received signals through this complementary filter, the adaptive equalizer may reduce distortion imparted to the signal by the transmission channel.

Figure 8:
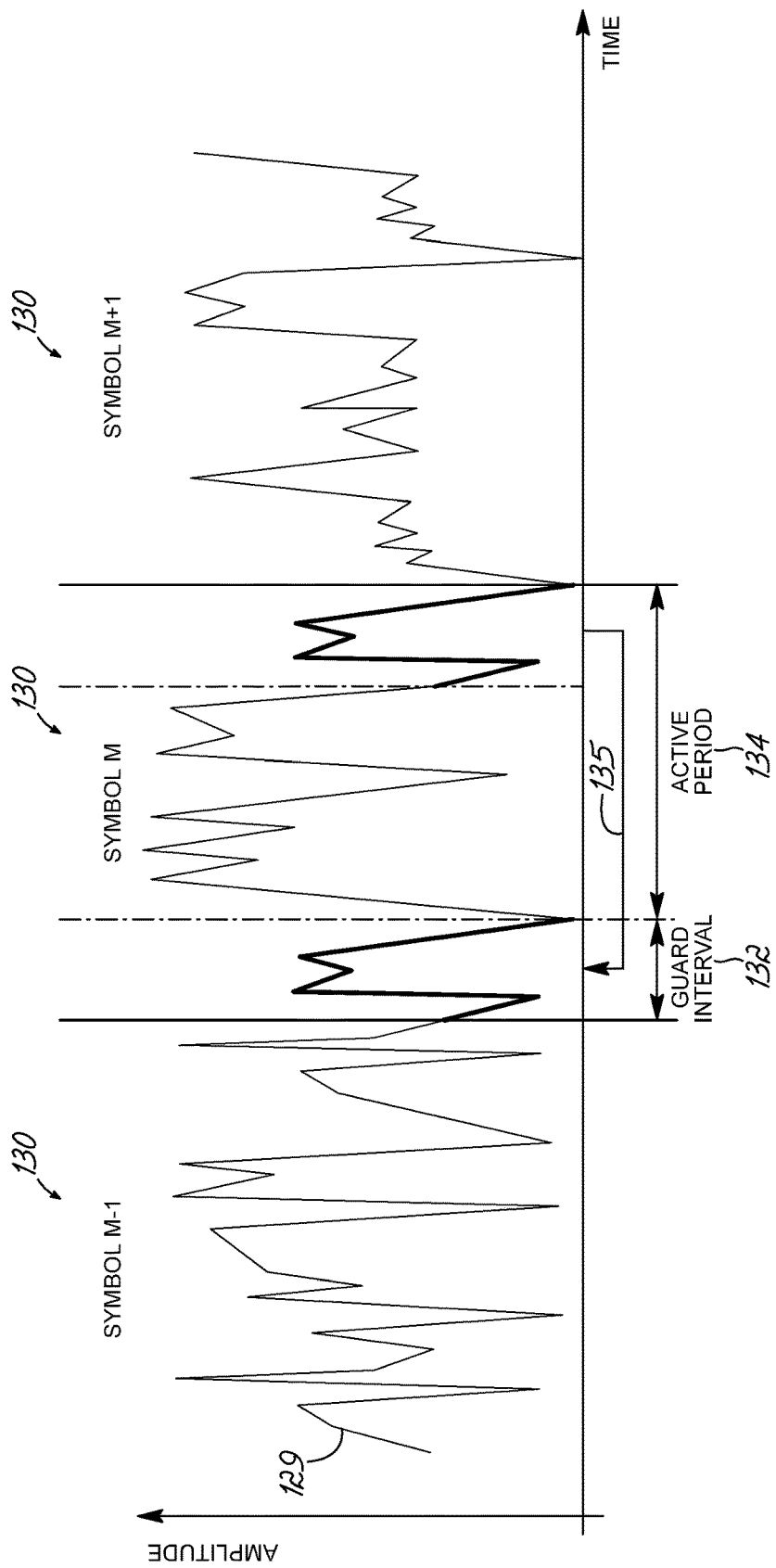
FIG. 8 is an amplitude verses time graph illustrating an exemplary OFDM signal.
Figure 9:
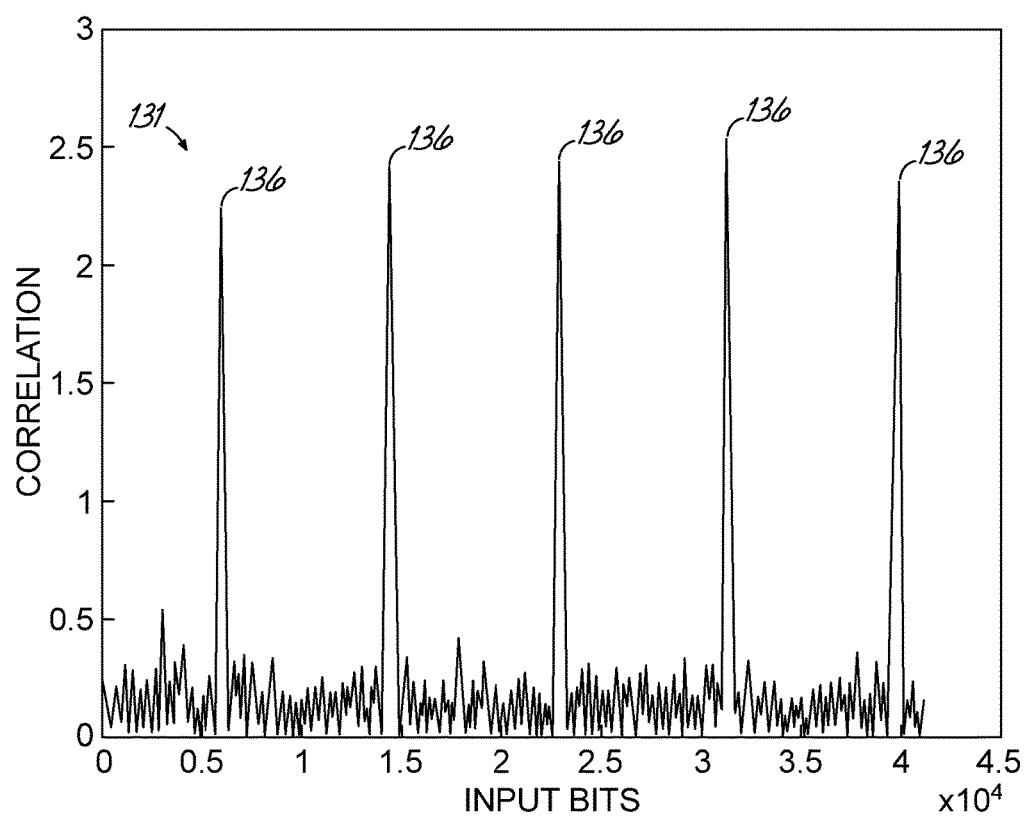
FIG. 9 is a graph illustrating a self correlation of an OFDM signal.

Referring now to FIGS. 8 and 9, FIG. 8 illustrates a plot 129 of an exemplary OFDM signal, and FIG. 9 illustrates a plot 131 representing results of a self-correlation of a decoded OFDM signal. FIGS. 8 and 9 are presented for the purpose of describing the operation of an embodiment of the signal processor component 112. The OFDM signal 129 includes a sequential series of transmitted symbols 130 each having a guard interval 132 and an active period 134 that contains transmitted data. The guard interval 132 precedes its associated active period to separate adjacent active periods 134, and contains repeated data from the end of the associated active period 134, as indicated by arrow 135. Because data from the end of the active period 134 is transmitted during the guard interval 132, the signal transmitted during the guard interval 132 should have the same contour as the end of the active period 134. The redundant data in the guard interval 132 thereby provides a cyclic prefix that serves two purposes.

First, the temporal spacing provided by the cyclic prefix prevents symbol spreading caused by multipath reflections from causing Inter-Symbol Interference (ISI) between adjacent active periods 134. To prevent ISI, the cyclic prefix has a longer duration than the expected maximum delay spread in the channel. Second, by repeating the same data at the beginning and end of the symbol 130, the cyclical prefix allows the beginning of the symbol 130 to be detected by performing a self-correlation of the received OFDM signal. This self correlation will normally produce output peaks 136 when the end of the active period 130 is aligned with the cyclical prefix. The correlation peaks 136 thereby provide an indication of the location of the beginning of a symbol 130. This facilitates determining where to place a Discrete Fourier Transform (DFT) window, so that an individual symbol 130 may be accurately converted into the frequency domain. The cyclical prefix thereby simplifies and improves frequency-domain conversion of received OFDM symbols, which facilitates estimating the channel transfer function and calculating equalization coefficients. In addition, by determining the phase difference between chips in the guard interval and the same chips at the end of the symbol (i.e., the end of the active period), a fractional part of the frequency error between BTS and repeater can be determined.

Air interfaces that utilize OFDM pilot assisted technologies include a known pilot carrier. This known pilot carrier may be inserted in every transmitted symbol, such as is done in Wimax, Digital Video Broadcasting-Terrestrial (DVB-T), and Digital Video Broadcasting-Handheld (DVB-H), or the pilot carrier may be inserted in a dedicated time scheduled symbol, such as is done in 3GPP Long Term Evolution (LTE). The known pilot carriers allow the channel transfer function to be determined in the frequency domain using linear interpolation or Least Mean Square (LMS) algorithms. These algorithms are typically used in combination with linear, square, cubic, or various other interpolation techniques to calculate the channel transfer function in a deterministic way.

In accordance with embodiments of the invention for handling such air interface signals (such as WiMax, LTE, and DVB), the coefficient calculation circuit 124 is configured to generate equalizer coefficients according to the channel transfer function calculated from the pilot signals embedded in the received signal. For air interfaces employing CDMA technologies, such as UMTS, the coefficient calculation circuit 124 employs chip level equalization Minimum Mean Square Error (MMSE) estimation, block linear equalizers, and/or MMSE adaptive linear equalizers as is known in the art. The signal processor component 112 may thereby determine phase and amplitude transfer functions between the BTS 12 and/or wireless device 14 and signal processing module 68, 70 for each signal path 114a-114n. These phase and amplitude transfer functions may be used to remove distortion from the received downlink and/or uplink signal 90, 109 as well as to repair errors caused by interference before repeating the signals into the extended coverage area.

In an embodiment of the invention, the process of determining the phase transfer function of the signal channel includes estimating a frequency error between the system reference clock in the BTS 12 and the system reference clock 89, 113 in the signal processing module 68, 70. Frequency shifts or errors may also be introduced by relative motion between the signal source and the processing module 68, 70, which may cause a Doppler shift in the received signal.

Typically, in the BTS 12, the same system reference clock is provided to the synthesizer that generates the transmit carrier frequency and the clock input for the analog to digital and digital to analog converters. The carrier frequency and the digital sampling rate of the signal transmitted by the BTS 12 are thus synchronized. If the system reference clock in the BTS 12 and the system reference clock 89, 113 in the signal processing module 68, 70 are not synchronized, a frequency error may develop between the transmitted carrier signal and local carrier signals generated in the signal processing module 68, 70. If a difference exists between the carrier frequency transmitted by the BTS and the local carrier signal, the resulting phase drift will cause the received symbols to rotate in the phase domain. To correct for this phase drift, the signal processor component 112 estimates a frequency error between the BTS 12 and signal processing module reference clock 89, 113 as part of the phase transfer function calculation.

Figure 10A:
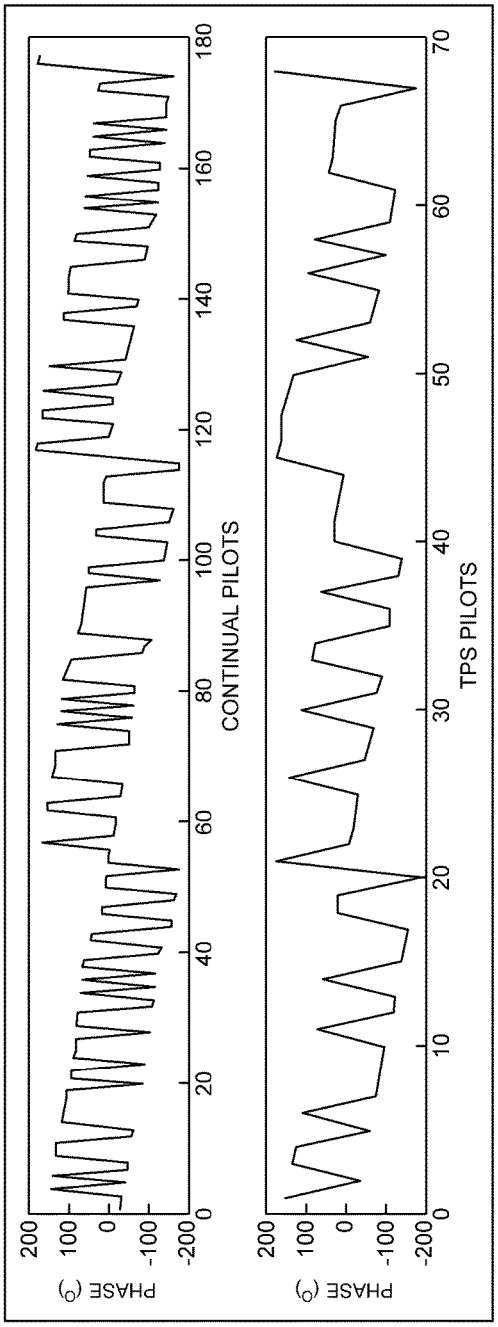
FIG. 10A is a graphical illustration of OFDM pilot signals suffering from phase drift due to a frequency error.
Figure 10B:
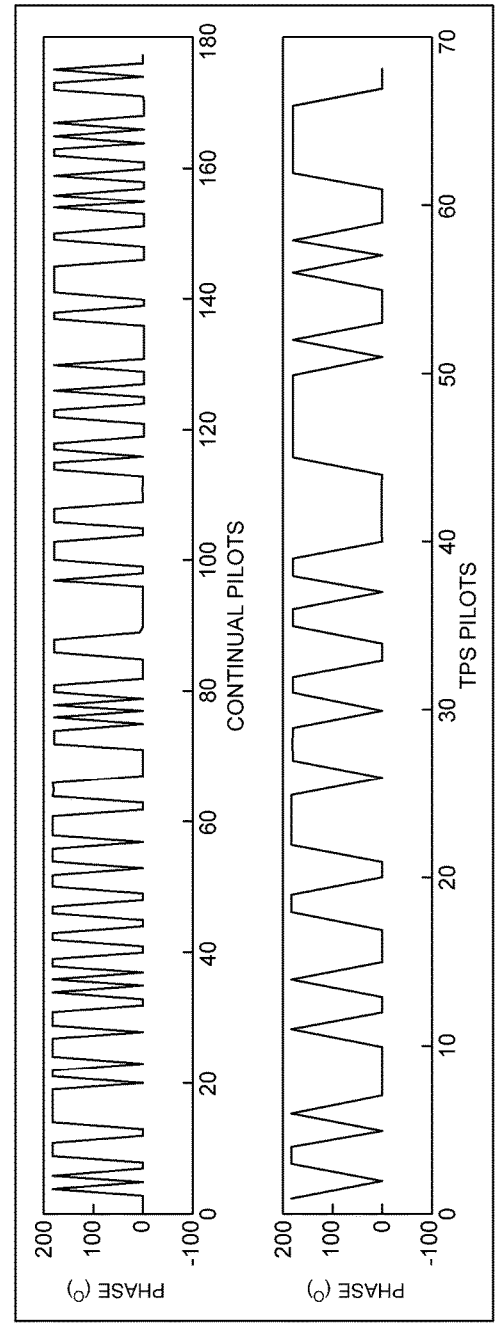
FIG. 10B is a graphical illustration of the OFDM pilot signals in FIG. 10A after correcting the frequency error.

Referring now to FIGS. 10A and 10B, exemplary plots are presented for a received OFDM subcarrier that is experiencing phase drift due to a frequency difference between system reference clocks. The received signals are illustrated in FIG. 10A, and the corrected signals are illustrated in FIG. 10B. The top plot in each figure shows the decoded phase for a continual pilot signal that is inserted into fixed sub-carriers in each transmitted symbol 130. The bottom plot in each figure shows the decoded phase for a Transmission Parameter Signal (TPS) pilot signal, which is conveyed over multiple symbols 130. As can be seen from the downward slope of the plots in FIG. 10A, differences between reference clock frequencies in the BTS 12 and signal processor component 112 cause the OFDM symbol window to drift. Thus, in the absence of clock synchronization, the received OFDM symbol may drift away from the ideal observation window. This frequency error may also manifest itself in correlation peaks 136 that are shifted in time so that the detected symbol start position becomes misaligned with the transmitted symbol.

Left uncorrected, the accumulated phase drift may cause a receiving device to decode the received signal into OFDM symbols that do not have an equal number of detected bits. According to an embodiment of the invention, to correct for this phase drift, the signal processor component 112 is configured to determine the frequency error by comparing the frequency of the received carrier signal to the frequency of the local carrier signal. Based on this frequency error, the signal processor component 112 adjusts the system reference clock 89, 113 and/or sampling frequencies so that the frequency of the local carrier signal matches that of the received carrier signal. The signal processor component 112 thereby adjusts for the phase drift by correcting the frequency error. Synchronizing the reference clock frequencies reduces or eliminates phase drift, so that the average slope of the decoded pilot signals is flat over time as illustrated in FIG. 10B.

Random short term phase errors, or phase noise, in the received signal 90, 109 is also corrected by the equalizer 120a-120n in another aspect of the invention. Frequency offset noise introduced by local oscillators in the BTS 12 and signal processing module 68, 70 is thus reduced by the equalizer 120a-120n. The phase noise of the processed signals 76, 100 is thus determined by the noise characteristics of the reference clock 89, 113 in the signal processing module 68, 70 rather than by the noise present in the received signal. Advantageously, this clock synchronization and equalization may thereby further reduce the noise in the repeated signals 40, 46 as compared to a conventional signal repeating system 10.

To achieve frequency synchronization in accordance with one aspect of the invention, the downlink and uplink signal processing modules 68, 70 continually monitor the frequency error between the received carrier signal and the local carrier signal. To avoid constant small changes to the reference clock frequency, a threshold is used for making clock adjustments. To this end, in response to the detected frequency error exceeding a predefined maximum threshold, the signal processing module 68, 70 adjusts the frequency of the system reference clock 89, 113. Because the local carrier signal generator 117a-117n is synchronized to the reference clock 89, 113, adjusting the frequency of the reference clock 89, 113 also results in the frequency of the local carrier signal changing proportionally to the clock adjustment. The frequency error may thereby be corrected by adjusting the frequency of the reference clock 89, 113 so that the received carrier signal is synchronized to the local carrier signal.

In accordance with another aspect of the invention, the signal processor component 112 may also provide a frequency offset to each signal path 114a-114n individually to accommodate the unique frequency characteristics of each processed signal. Providing an individual frequency offset to each signal path 114a-114n allows frequency errors in signals being processed from multiple BTSs 12 and/or multiple wireless devices 14 to be compensated for individually. This individual compensation may be accomplished, for example, by using separate reference clocks for each signal path 114a-114n, or by varying the frequency of the local carrier signal provided to the associated input mixer circuit 116a-116n and/or output mixer circuit 122a-122n.

By adjusting the frequency of the system reference clock 89, 113, and using frequency offsets in the individual channel paths 114a-114n, the frequency error between the BTS 12, wireless device 14, and the signal processing modules 68, 70 is reduced. This reduction in frequency error allows the equalizer circuit 120a-120n to maintain the frequency error and offset noise within the noise error of the processing module system reference clock 89, 113. Advantageously, this reduced frequency error and noise may improve frequency synchronization between the wireless devices 14 and associated BTS 12 as compared to conventional repeater systems.

In accordance with another aspect of the invention, the signal processor component 112 also determines an amplitude transfer function between the signal source (e.g., the BTS 12 or wireless device 14) and the signal processing module 68, 70. The amplitude transfer function is used to calculate the equalizer coefficients. By correcting the amplitude spectrum of the received signals 90, 109, the equalizer circuit 120a-120n reduces multipath interference, Gaussian noise, and interference signals present in the received signal 90, 109. Advantageously, these repaired signals may result in reduced bit error rates and improved link quality between the BTS 12 and wireless device 14 as compared to conventional repeater systems that lack the equalization of the present invention.

Figure 11A:
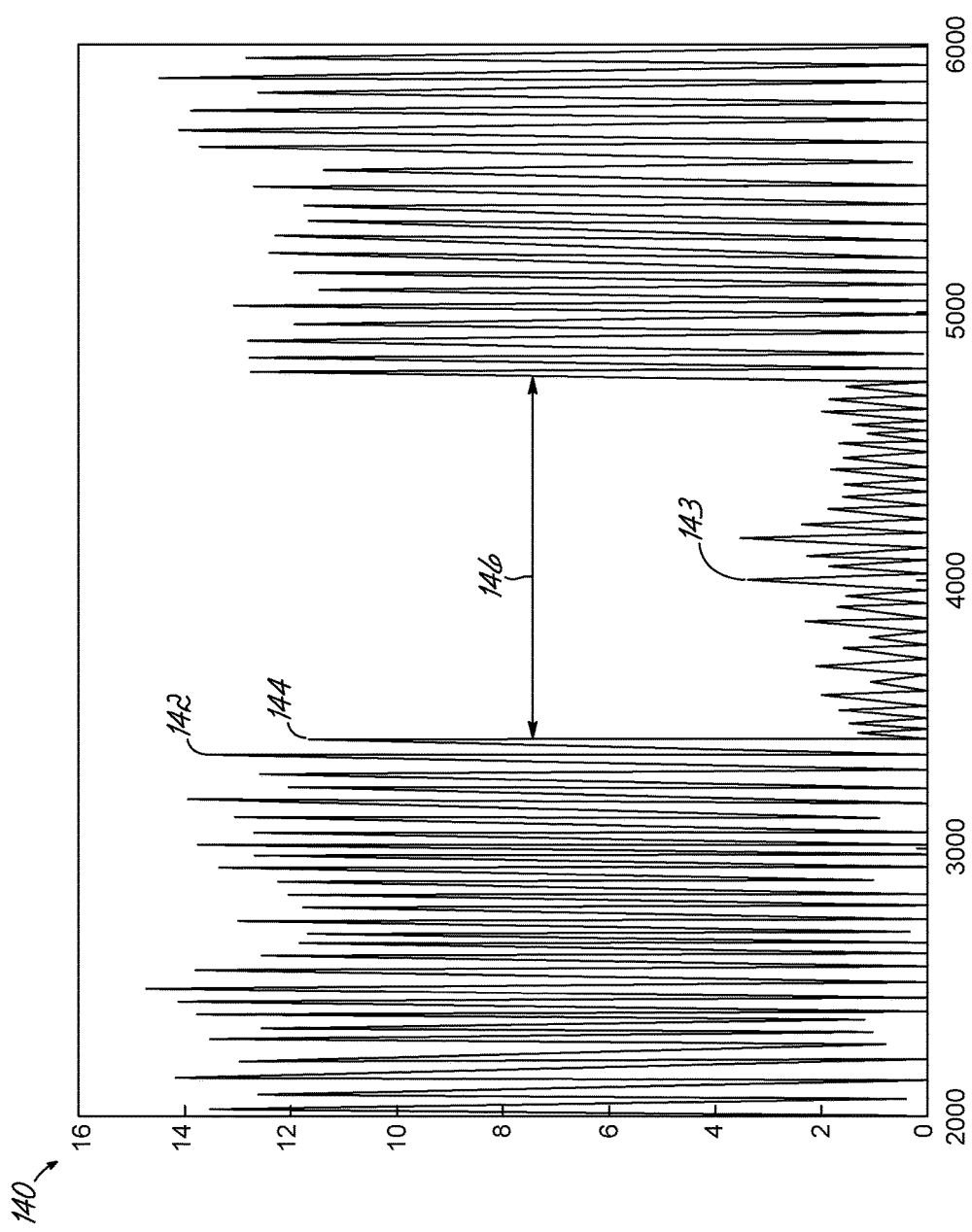
FIG. 11A is a graphical illustration of an OFDM symbol in the frequency domain before equalization.

FIG. 11A illustrates a frequency domain representation 140 of an unprocessed or raw OFDM signal. This exemplary OFDM signal may be obtained, for example, by performing a Discrete Fourier Transform (DFT) on a received symbol 130. The frequency domain representation 140 includes a plurality of subcarriers, which may include pilot subcarriers 142 and data subcarriers 144 transmitted in known frequency locations and with known amplitudes. A frequency region 146 represents a frequency region that is not used by the OFDM signal. Thus, any energy in frequency region 146 is assumed to be noise 143. It should be understood, however, that the number of subcarriers shown in FIG. 11A may not represent an actual number or combination of subcarriers in a typical ODFM signal for purposes of clarity. Because the amplitudes and frequencies of the subcarriers 142, 144 are typically defined by the air interface standard in use, equalizer coefficients may be determined by choosing coefficients that cause the spectral response to match the standard. In the case of the OFDM signal in FIG. 11A, the subcarriers 142, 144 may all be transmitted with known power level differences, with pilot subcarriers 142 having a somewhat higher constant power level than data subcarriers 144. The equalizer coefficients may therefore be determined by selecting coefficients that will result in like subcarriers having the same amplitude.

To this end, equalizer coefficients are typically chosen that result in a minimum mean squared error between the equalized carrier amplitudes and the expected carrier amplitudes. By way of example, for each received symbol y[k], a set of coefficients c[k] is calculated that minimizes the mean squared error between the known amplitudes of the subcarriers in the transmitted symbol s[k] and the subcarriers of the equalized received symbol c[k]*y[k], where * represents a convolution operator. The coefficients c[k] for each received symbol y[k] may thereby be determined by solving the mean-squared error equation $(s[k]-c[k]*y[k])^2$ to obtain a minimum value. Once determined, the coefficients c[k] are loaded into the equalizer 120a-120n associated with the symbol in question and used to filter the received signal in the time domain. In an alternative embodiment, the signal may be filtered by adjusting the amplitudes of each received subcarrier in the frequency domain with a set of subcarrier multiplier coefficients c[z], and converted back to the time domain for transmission using an Inverse Discrete Fourier Transform (IDFT). In either case, the result is an equalized received signal having an amplitude response similar to that of the transmitted symbol.

Figure 11B:
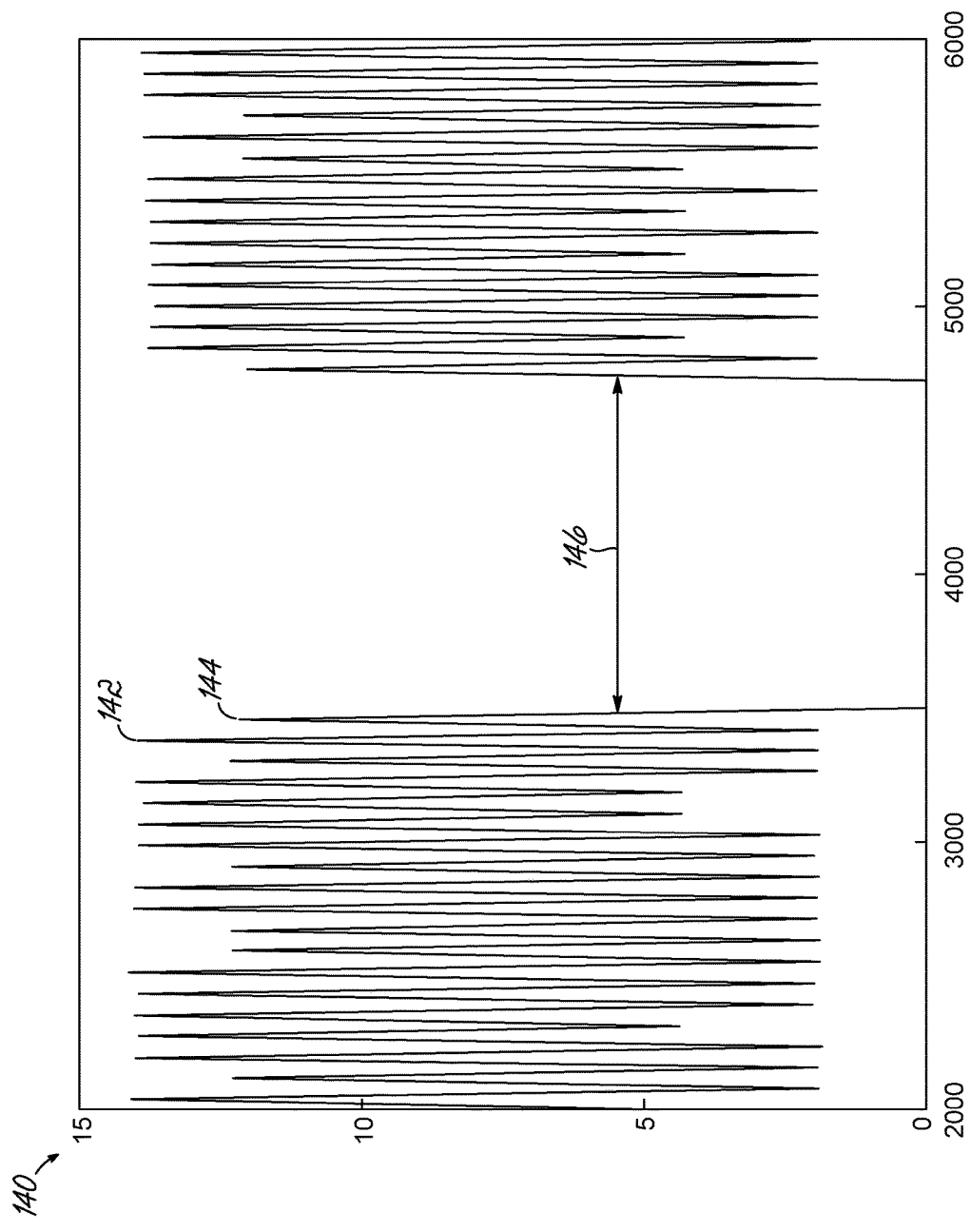
FIG. 11B is a graphical illustration the OFDM symbol in FIG. 11A after equalization.

FIG. 11B illustrates the spectrum of the symbol in FIG. 11A after being processed through a signal path 114a-114n with a properly configured equalizer 120a-120n in accordance with the present invention. By correcting the spectrum amplitude of the received signal, thermal noise power and interference signals may be reduced. Moreover, noise power can be estimated based on the raw signals as any energy in the frequency region 146 is known to be caused by noise or other interfering signals. The noise and interference estimate can then be used to adjust the coefficients of the associated channel filter 118a-118n to minimize the detected Bit Error Rate (BER). The nonlinearities caused by interference are thereby reduced by the channel filter 118a-118n and equalizer 120a-120n prior to the signal being repeated.

Figure 12A:
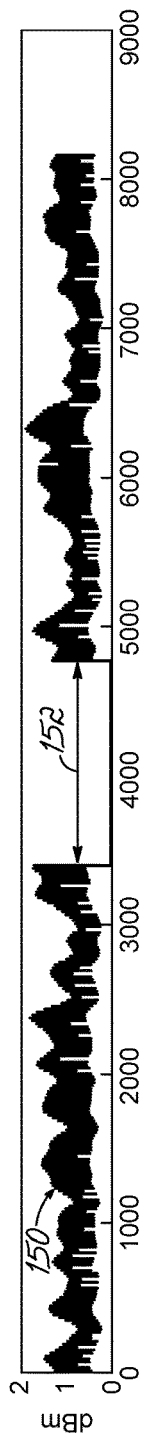
FIG. 12A is a graph illustrating the amplitude spectrum of an OFDM symbol in the frequency domain showing the effects of strong in-band interference.

Referring now to FIGS. 12A-12J, exemplary graphical representations illustrating how a received signal experiencing high levels of interference may be repaired by the signal processing unit 34 of the signal repeating system 10 are presented. FIG. 12A illustrates a frequency domain plot 150 of carrier amplitude verses frequency for an exemplary received signal—e.g., after the signal processor component 112 has performed a DFT on the received signal. The plot 150 may thus represent a frequency domain plot of carrier amplitude verses frequency for a symbol of an OFDM signal similarly as described with respect to FIG. 8. As is readily apparent, the amplitudes of the subcarriers recovered from the OFDM symbol in FIG. 12A do not match those of a standardized OFDM symbol such as illustrated in FIG. 11B. The periodic variation in the amplitudes of the subcarriers shown by plot 150 may be an indication that there is a strong interfering signal present in the received signal, for example. This strong interfering signal may be generated by another base station, a mobile station, or any other device that is emitting energy in the operational band of the signal repeating system 10. As can be seen by the lack of energy in the frequency region 152, the noise has been removed as an early step in repairing the received signal and as discussed above with respect to FIGS. 11A and 11B.

Figure 12B:
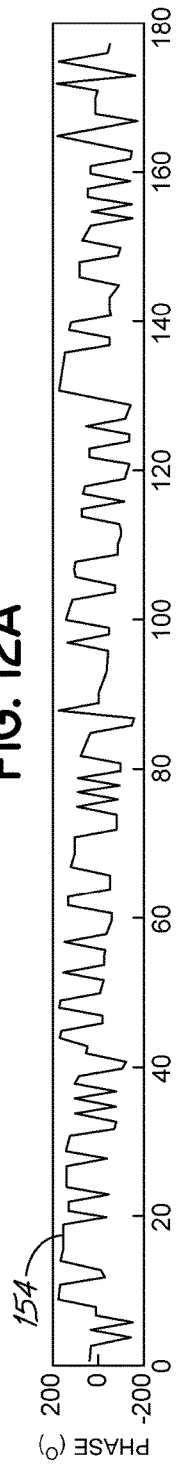
FIG. 12B is a graph illustrating phase drift in a continual pilot signal from the OFDM symbol in FIG. 12A before frequency correction.
Figure 12C:
FIG. 12C is a graph illustrating phase drift in a TPS pilot signal from the OFDM symbol in FIG. 12A before frequency correction.

FIGS. 12B and 12C show plots of phase with respect to time of a continual pilot signal 154 and a TPS pilot signal 156, both of which were decoded from the received signal 150 shown in FIG. 12A. The phases of the pilot signals 154, 156 are shown prior to frequency correction, and are experiencing a phase drift that adds a downward slope to the signals. This phase drift may be due to a mismatch between the reference clocks of the signal source and the signal processing module 68, 70 and/or the effects of one or more interfering signals as discussed herein. As a result of the phase drift, the pilot signals 154, 156 experience a phase inversion each time the accumulated phase error exceeds 180 degrees.

Figure 12D:
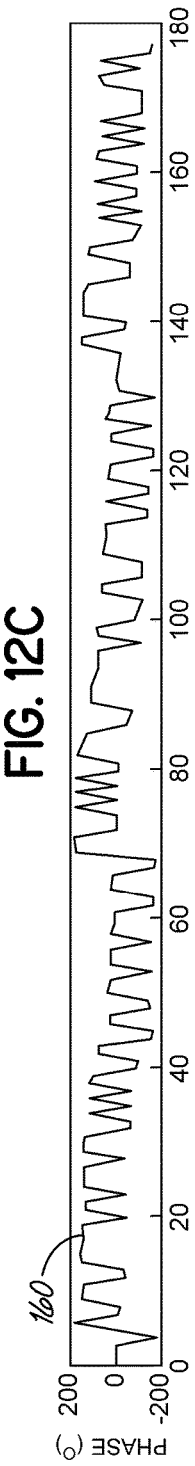
FIG. 12D is a graph illustrating the phase of the continual pilot signal of FIG. 12B after frequency correction.
Figure 12E:
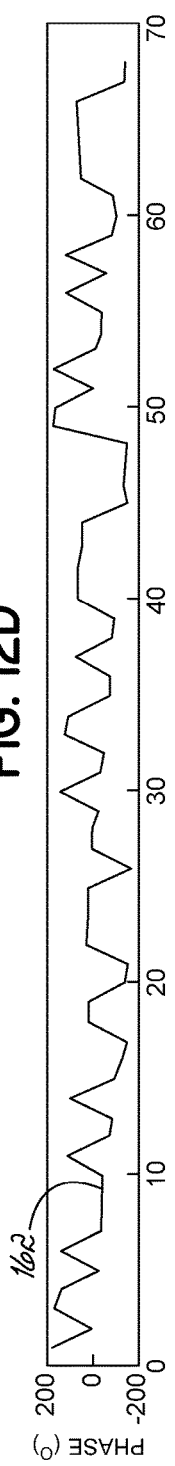
FIG. 12E is a graph illustrating the phase of the TPS pilot signal of FIG. 12C after frequency correction.

FIGS. 12D and 12E show plots of the continual pilot signal 160 and TPS pilot signal 162 after frequency correction. That is, the pilot signals 160, 162 illustrated in FIGS. 12D and 12E represent the pilot signals 154, 156 in FIGS. 12B and 12C after frequency correction in the signal processing unit 34. Frequency correction may be accomplished by adjusting the frequency of the system reference clock or adding a frequency offset to the signal as described with respect to FIGS. 10A and 10B above. As can be seen from the plots, after correcting the long term or fixed frequency error caused by lack of synchronization between the system reference clocks, a residual phase error remains. This residual phase error may be due to one or more interfering signals or to noise, which causes the phase angles of pilot carriers to deviate from their predefined values.

Referring now to FIG. 12F, a frequency domain plot 164 of the received signal from FIGS. 12A-12E after application of the frequency correction described with respect to FIGS. 12B-12E and amplitude equalization is presented. As described with respect to FIGS. 11A and 11B, the equalizer coefficients may be determined so that the resulting equalizer response normalizes the subcarrier amplitudes to their expected values. The resulting post-equalization subcarrier amplitudes are thereby made to approximate those expected from a standardized OFDM symbol. The resulting equalizer response largely eliminates the effects of the interfering signal. The repaired signal 164 is then transmitted into the extended coverage area where it may be received by a wireless device 14.

Referring now to FIGS. 12G and 12H, plots of phase with respect to time of the continual pilot signal 166 and the TPS pilot signal 168 are illustrated. The pilot signals 166, 168 are pilot signals decoded from the repaired signal 164 after being transmitted from the signal repeating system 10 and received by the wireless device 14. Pilot signals 166, 168 thus represent a signal that has been repaired in the signal repeating system 10 by the frequency and amplitude correction as discussed with respect to FIGS. 12A-12F prior to retransmission. However, a new phase drift has been introduced into the received signal due to a difference in frequency between the reference clocks in the wireless device 14 and signal processing module 68, 70. This phase drift may be seen as a slight downward slope in the received pilot signals 166, 168.

To correct this newly introduced phase drift, the wireless device receiver may synchronize its reference clock with the reference clock in the signal processing unit 34. The resulting corrected continual pilot signal 170 and TPS pilot signal 172 are shown in FIGS. 12I and 12J, respectively. The pilot signals 170, 172 thus represent the received pilot signals 166, 168 after frequency correction by the equalizer in the wireless device 14. As can be seen, by removing the interfering signal at the signal repeating system 10 prior to retransmission to the wireless device 14, the wireless device 14 is able to more fully recover the phase of the pilot carriers by applying a second round of phase correction to the signal. The performance of the wireless device 14 may thereby be enhanced as compared to wireless devices 14 operating in an extended coverage area provided by a conventional repeater system.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatuses and methods, nor the illustrative examples shown and described. Accordingly, departures may be made from such details without departure from the spirit or scope of applicant's general inventive concept.

What is claimed is:

1. A communication system comprising:
   at least one donor antenna for receiving wireless signals having a carrier signal from a signal source;
   processing circuitry including at least one equalizer that is operatively coupled to the donor antenna, the processing circuitry receiving the wireless signals through the donor antenna and processing the wireless signals through the equalizer to generate processed signals for retransmission;
   the processing circuitry including at least one local carrier signal and being configured for determining a frequency error between a carrier signal of the received wireless signals and the at least one local carrier signal;
   the processing circuitry, in response to the determined frequency error, configured for providing a compensation to the frequency error.

2. The communication system of claim 1 wherein the processing circuitry includes a system reference clock, the processing circuitry further configured for determining the frequency error by estimating a frequency error between the system reference clock and a clock associated with the signal source.

3. The communication system of claim 2, the processing circuitry providing a compensation to the frequency error by adjusting the frequency of the system reference clock.

4. The communication system of claim 1 further comprising providing compensation to the frequency error by changing the frequency of the local carrier signal.

5. The communication system of claim 1, the processing circuitry including a system reference clock and providing a compensation to the frequency error by adjusting the system reference clock so that the local carrier signal is synchronized with the carrier signal of the received wireless signals.

6. The communication system of claim 1 wherein the processing circuitry defines a signal path therethrough that includes the local carrier signal, the processing circuitry providing a compensation to the frequency error by providing a frequency offset to signals processed in the signal path.

7. The communication system of claim 6 wherein the processing circuitry includes a system reference clock and a local carrier signal generator that is synchronized to the system reference clock, the frequency offset being provided by adding an estimated frequency offset to the system reference clock.

8. The communication system of claim 1, the processing circuitry including a system reference clock and a plurality of signal paths for processing a plurality of wireless signals, each signal path including an equalizer and a local carrier signal, the processing circuitry configured for providing a compensation to the frequency error for wireless signals in the plurality of signal paths.

9. The communication system of claim 8, the processing circuitry configured for determining a frequency error between a carrier signal of received wireless signals and a local carrier signal in at least one of the plurality of signal paths and the processing circuitry providing a compensation to the frequency error for the at least one signal path by adjusting the reference clock for that signal path.

10. The communication system of claim 8 wherein the processing circuitry provides a compensation to the frequency error in at least one signal path of the plurality of signal paths by providing a frequency offset to the at least one signal path.

11. The communication system of claim 1 wherein the processing circuitry is configured to adapt the equalizer to at least one characteristic of a communication channel that couples the processing circuitry to a source of the wireless signals.

12. The communications system of claim 11, wherein the equalizer includes a plurality of coefficients and is configured to adapt to the communication channel by comparing a processed signal to a known signal and adjusting the equalizer coefficients to reduce the difference between the processed signal and the known signal.

13. The communication system of claim 11 wherein the at least one characteristic includes at least one of a phase transfer function, an amplitude transfer function, or a frequency error.

14. The communication system of claim 1 wherein the donor antenna receives the wireless signals from a base transceiver station (BTS) over a wireless communication channel and the processed signals are retransmitted into an extended coverage area.

15. The communications system of claim 1 wherein the communications system includes at least one of a repeater or distributed antenna system.

16. A method of providing wireless signals to an extended coverage area, the method comprising:
receiving wireless signals transmitted from a signal source through a wireless communication channel;
processing the wireless signals with processing circuitry including at least one local carrier signal and an equalizer configured to compensate for distortion added to the wireless signals by the wireless communication channel;
determining a frequency error between a carrier signal of the received wireless signal and the local carrier signal;
providing a compensation to the frequency error and transmitting the wireless signals into the extended coverage area.

17. The method of claim 16, wherein determining the frequency error includes:
estimating a frequency error between a system reference clock used to process the wireless signal and a clock associated with the wireless signal source.

18. The method of claim 17, wherein providing a compensation to the frequency error includes at least one of adjusting the frequency of the system reference clock or changing the frequency of the local carrier signal or providing a frequency offset to a wireless signal processed by the processing circuitry.

19. The method of claim 17 comprising providing a compensation to the frequency error by adjusting the system reference clock so that the local carrier signal is synchronized with the carrier signal of the received wireless signal.

20. The method of claim 16 further comprising processing the wireless signals with processing circuitry that has a plurality of signal paths for processing a plurality of signals, each signal path including an equalizer and a local carrier signal, and providing a compensation to the frequency error for wireless signals in the plurality of signal paths.

* * * * *